United States Patent
Lin

(10) Patent No.: US 12,235,647 B2
(45) Date of Patent: Feb. 25, 2025

(54) NAVIGATION METHOD, MOVING CARRIER AND NAVIGATION SYSTEM

(71) Applicant: HAI ROBOTICS CO., LTD., Guangdong (CN)

(72) Inventor: Han Lin, Guangdong (CN)

(73) Assignee: HAI ROBOTICS CO., LTD., Guangdong (CN)

(*) Notice: Subject to any disclaimer, the term of this patent is extended or adjusted under 35 U.S.C. 154(b) by 429 days.

(21) Appl. No.: 17/570,732

(22) Filed: Jan. 7, 2022

(65) Prior Publication Data

US 2022/0128998 A1   Apr. 28, 2022

Related U.S. Application Data

(63) Continuation of application No. PCT/CN2020/100879, filed on Jul. 8, 2020.

(30) Foreign Application Priority Data

Jul. 11, 2019 (CN) .......................... 201910625924.3

(51) Int. Cl.
   *G05D 1/00* (2006.01)
   *G01C 21/34* (2006.01)
   *G01S 17/931* (2020.01)

(52) U.S. Cl.
   CPC ....... *G05D 1/0212* (2013.01); *G01C 21/3407* (2013.01); *G01S 17/931* (2020.01); *G05D 1/0246* (2013.01)

(58) Field of Classification Search
   CPC .. G05D 1/0212; G05D 1/0246; G01S 17/931; G01C 21/3407
   See application file for complete search history.

(56) References Cited

U.S. PATENT DOCUMENTS 9,908,702 B2   3/2018   Elazary et al.
10,289,990 B2   5/2019   Rizzolo et al.
(Continued)

FOREIGN PATENT DOCUMENTS

CA   2981673 A1   4/2018
CN   104932496 A   9/2015
(Continued)

OTHER PUBLICATIONS

ISR for International Application PCT/CN2020/100879 mailed Oct. 13, 2020.
(Continued)

*Primary Examiner* — Aryan E Weisenfeld
*Assistant Examiner* — Shivam Sharma
(74) *Attorney, Agent, or Firm* — Frank Gao, Esq.

(57) ABSTRACT

The present invention relates to the field of intelligent warehousing, and discloses a navigation method, a moving carrier, and a navigation system. The navigation method is applied to the moving carrier capable of traveling in a preset space including a roadway formed by at least two rows of shelving units opposite to each other. The navigation method includes: acquiring deviated position information of the moving carrier in a non-traveling direction relative to the shelving units in the roadway, and navigating the moving carrier according to the deviated position information. The moving carrier is prevented from hitting the shelving units, and, besides, can be reliably navigated in the roadway.

13 Claims, 11 Drawing Sheets

(56) References Cited

U.S. PATENT DOCUMENTS

| | | | |
|---|---|---|---|
| 10,429,833 B2 | 10/2019 | Schulz et al. | |
| 10,466,713 B2 | 11/2019 | Elazary et al. | |
| 2017/0225891 A1* | 8/2017 | Elazary | G05D 1/0234 |
| 2017/0285648 A1* | 10/2017 | Welty | G05D 1/0248 |
| 2018/0107999 A1* | 4/2018 | Rizzolo | H04N 23/90 |
| 2018/0143624 A1 | 5/2018 | Schulz et al. | |
| 2019/0171220 A1 | 6/2019 | Elazary et al. | |
| 2022/0011779 A1 | 1/2022 | Kim | |

FOREIGN PATENT DOCUMENTS

| | | | | |
|---|---|---|---|---|
| CN | 105974922 A | | 9/2016 | |
| CN | 106081454 A | | 11/2016 | |
| CN | 108051007 A | | 5/2018 | |
| CN | 108089574 A | | 5/2018 | |
| CN | 109637339 A | * | 4/2019 | G09B 29/005 |
| CN | 105974922 B | | 5/2019 | |
| CN | 109990784 A | | 7/2019 | |
| CN | 109990785 A | | 7/2019 | |
| DE | 102016122485 A1 | | 5/2018 | |
| EP | 3309727 A1 | | 4/2018 | |
| EP | 3323770 A1 | | 5/2018 | |

OTHER PUBLICATIONS

Written Opinion for International Application PCT/CN2020/100879 mailed Oct. 13, 2020.

First Office Action of the counterpart application CN201910625924.3, dated Jul. 31, 2024 (English translation not available).

* cited by examiner

NAVIGATION METHOD, MOVING CARRIER AND NAVIGATION SYSTEM

CROSS-REFERENCE TO RELATED APPLICATIONS

This application is a continuation of International Patent Application No. PCT/CN2020/100879 filed on 8 Jul. 2020, which claims priority to Chinese Patent Application No. 201910625924.3, entitled "NAVIGATION METHOD, MOVING CARRIER AND NAVIGATION SYSTEM", filed with China National Intellectual Property Administration on 11 Jul. 2019, which is incorporated herein by reference in its entirety.

TECHNICAL FIELD

The present invention relates to the field of intelligent warehousing, and in particular, to a navigation method, a moving carrier, and a navigation system.

BACKGROUND

Existing moving carriers may be navigated in a warehouse by using a visual technology so as to accomplish warehousing tasks assigned by administrators.

When a moving carrier performs a warehousing task in a warehouse, the moving carrier is generally navigated by QR codes. That is, the QR codes are pasted on the ground according to a certain rule, and the moving carrier acquires information of the QR codes pasted on the ground during movement and converts the information into navigation data for the moving carrier. However, with the QR code-based navigation method, it is easy to make mistakes when pasting codes on the ground, which leads to unreliable operation of the moving carrier.

SUMMARY

Embodiments of the present invention provide a navigation method, a moving carrier and a navigation system, which are reliable in operation.

To resolve the above-mentioned technical problem, the embodiments of the present invention provide the following technical solutions.

In a first aspect, an embodiment of the present invention provides a navigation method, applied to a moving carrier capable of traveling in a preset space including a roadway formed by at least two rows of shelving units placed opposite to each other. The method includes:
  acquiring deviated position information of the moving carrier in a non-traveling direction in the roadway relative to the shelving units; and
  navigating the moving carrier according to the deviated position information.

In a second aspect, an embodiment of the present invention provides a moving carrier, including:
  at least one processor; and
  a memory communicatively connected to the at least one processor.
  The memory stores instructions executable by the at least one processor, and the instructions are executed by the at least one processor to enable the at least one processor to execute the navigation method provided by any one of the embodiments.

In a third aspect, an embodiment of the present invention provides a navigation system, including:

a server; and
  the moving carrier provided by the corresponding embodiment in the second aspect of the present invention, communicating with the server.

Compared with conventional technologies, in the navigation method, the moving carrier and the navigation system provided by various embodiments of the present invention, the moving carrier is capable of traveling in a preset space including a roadway formed by at least two rows of shelving units placed opposite to each other. The method includes: calculating deviated position information of the moving carrier in a non-traveling direction relative to the shelving units in the roadway, and navigating the moving carrier according to the deviated position information. Therefore, the moving carrier is navigated based on the deviated position information in the non-traveling direction. The moving carrier is prevented from hitting the shelving units, and, besides, can be reliably navigated in the roadway.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

FIG. 4b is a schematic flowchart of S41 in FIG. 4a.

FIG. 7b is a schematic structure diagram of a calculation module in FIG. 7a.

DETAILED DESCRIPTION

To make the objectives, technical solutions, and advantages of the present invention clearer and more comprehensible, the following further describes the disclosure in detail with reference to the accompanying drawings and embodiments. It should be understood that the embodiments herein are provided for describing the present invention and not intended to limit the present invention.

Unless otherwise defined, meanings of all technical and scientific terms used in this specification are the same as those generally understood by a person skilled in the technical field to which the present invention belongs. Terms used in the specification of the present invention are merely intended to describe objectives of the specific implementations, and are not intended to limit the present invention. A term "and/or" used in this specification includes any or all combinations of one or more related listed items.

A navigation method provided by the present invention may be applied to any suitable industrial or technical field, such as the fields of intelligent warehousing, intelligent logistics and intelligent sorting.

A moving carrier provided by the present invention may be applied to any suitable industrial or technical field, such as the fields of intelligent warehousing, intelligent logistics and intelligent sorting.

When the moving carrier is applied to different industrial fields, the moving carrier may be configured as different structures to realize corresponding service functions. For example, when the moving carrier is applied to the field of intelligent warehousing, the moving carrier may be configured with a mechanical arm to grab goods.

Figure 1:
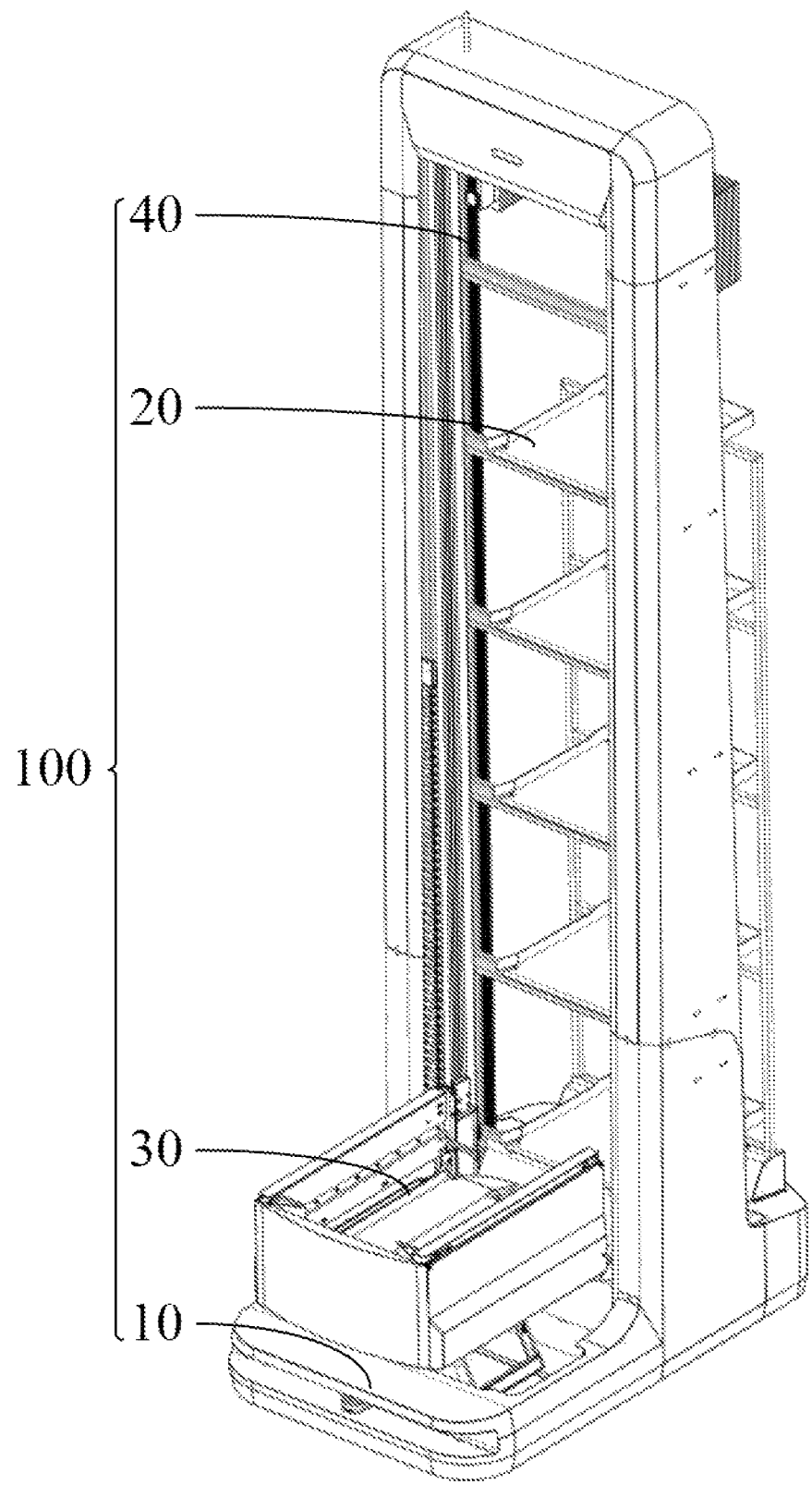
FIG. 1 is a schematic structure diagram of a moving carrier according to an embodiment of the present invention.

An embodiment of the present invention provides a moving carrier. Referring to FIG. 1, which is a schematic structure diagram of a moving carrier according to an embodiment of the present invention, a moving carrier 100 includes a moving chassis 10, a storage rack 20, a carrying apparatus 30, and a lifting assembly 40. The storage rack 20, the transport apparatus 30, and the lifting assembly 40 are all mounted on the moving chassis 10.

The moving chassis 10 is used to carry the moving carrier 100 to move along a planned path.

The storage rack 20 is used to store goods. In some embodiments, the storage rack 20 may include a plurality of storage units, and each storage unit may hold one or more goods.

The carrying apparatus 30 is movable in a vertical direction of the planned path so that the position of the carrying apparatus 30 is horizontally opposite to any one of the storage units, and the carrying apparatus 30 is used to carry goods between a preset position of a fixed shelving unit and any one of the storage units.

The lifting assembly 40 is used to drive the carrying apparatus 30 to move in the vertical direction relative to the storage rack 20, and the lifting assembly 40 includes a lifting transmission mechanism and a lifting driving mechanism. The lifting driving mechanism is used to provide a driving force for moving the carrying apparatus 30 in the vertical direction relative to the storage rack 20, and the lifting transmission mechanism is used to transmit a second driving force to the carrying apparatus 30.

Figure 2:
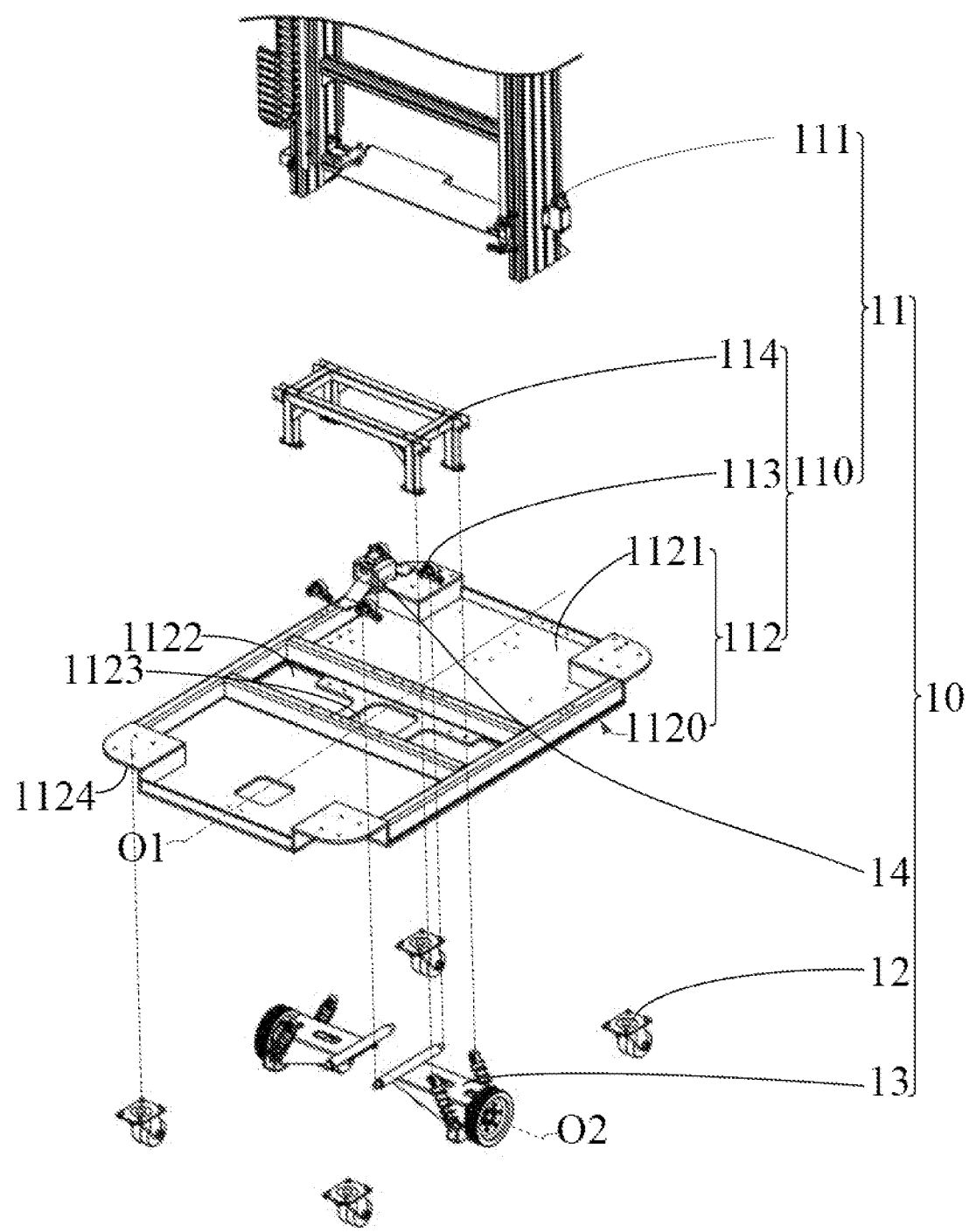
FIG. 2 is a schematic structure diagram of a moving chassis in FIG. 1.

In some embodiments, referring also to FIG. 2, which is a schematic structure diagram of a moving chassis in FIG. 1, the moving chassis 10 includes a bracket assembly 11, a driven wheel 12, a driving wheel assembly 13, and a guiding apparatus 14. The driven wheels 12, the driving wheel assemblies 13, and the guiding apparatus 14 are all mounted on the bracket assembly 11.

The bracket assembly 11 is formed by welding steel beams, steel plates, and outer casings together. The bracket assembly 11 includes a base 110 and a vertical bracket 111, and the vertical bracket 111 is mounted on the base 110.

The base 110 includes a base body 112, a shaft seat 113, and a shock absorber bracket 114, the shaft seat 113 is mounted on the base body 112, and the shock absorber bracket 114 is also mounted on the base body 112.

The base body 112 is a horizontally arranged rectangular plate body having an axis of symmetry S1, and the base body 112 includes a first surface 1120 and a second surface 1121 which are arranged oppositely to each other.

The base body 112 is provided with driven wheel mounting grooves 1122, a driving wheel mounting opening 1123, and a guiding apparatus mounting opening 1124.

The driven wheel mounting grooves 1122 are provided on the first surface 1120 of the base body 112, and the driven wheel mounting grooves 1122 are used to mount the driven wheels 12.

The driving wheel mounting opening 1123 penetrates through the first surface 1120 and the second surface 1121 of the base body 112, and the driving wheel mounting opening 1123 is used to hold the driving wheel assembly 13.

The guiding apparatus mounting opening 1124 penetrates through the first surface 1120 and the second surface 1121 of the base body 112, and the guiding apparatus mounting opening 1124 is used to mount the guide apparatus 14.

In an embodiment of the present invention, the guiding apparatus 14 may be a laser radar, a camera, or other suitable sensors. The laser radar or camera is used to scan legs of the shelving unit to obtain an image of the shelving unit.

Or, in some embodiments, unlike the embodiment described above, the guiding apparatus 14 may be installed at any suitable position on the bracket assembly 11 to shoot shelving boards or legs of the shelving units.

The shaft seat 113 and the shock absorber bracket 114 are both mounted on the second surface 1121 of the base body 112, and the shaft seat 113 and the shock absorber bracket 114 are used to mount the driving wheel assembly 13 together.

It should be noted that by providing the driven wheel mounting grooves 1122 for mounting the driven wheels 12 and the driving wheel mounting opening 1123 for holding the driving wheel assembly 13, it is possible to control the ground clearance and the center-of-mass height of the moving chassis 10, so that the ability of the moving chassis 10 to hold onto the ground is improved and the stability of movement of the moving chassis 10 is improved.

Figure 3A:
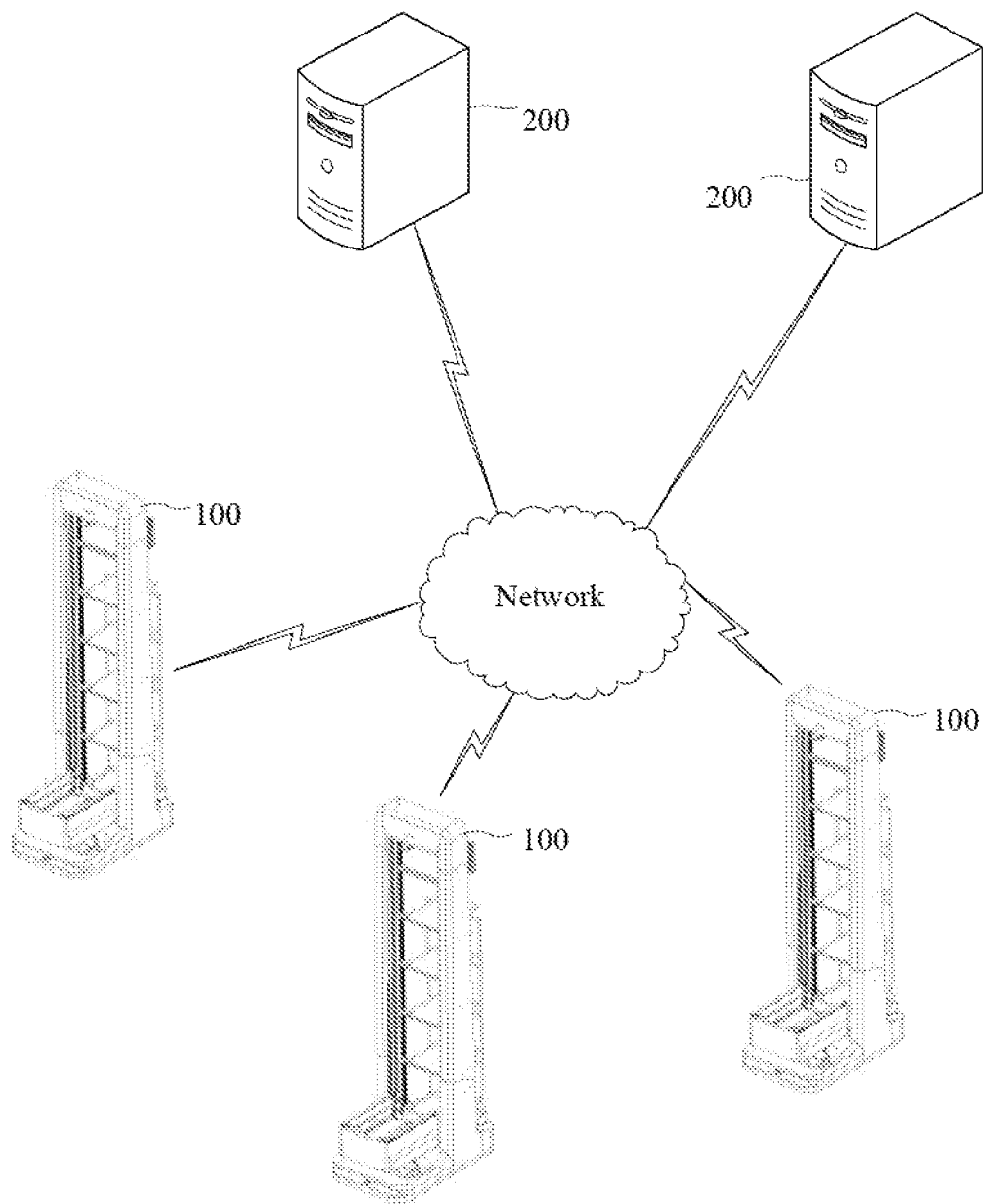
FIG. 3a is a schematic structure diagram of a navigation system according to an embodiment of the present invention.

In some embodiments, referring to FIG. 3a, which is a schematic structure diagram of a navigation system according to an embodiment of the present invention, a navigation system may be formed by the moving carrier 100 and a server 200. The moving carrier 100 communicates with the server 200 to achieve navigation, so as to successfully pick or store goods. For example, the moving carrier 100 receives a scheduling instruction from the server 200. The scheduling instruction includes a picking position, a destination position, a planned path, and goods information. The moving carrier 100 moves to the picking position in the warehouse along the planned path according to the scheduling instruction, picks corresponding goods, and then delivers the goods to the destination position. And, the moving carriers send own position information to the server 200, so that the server 200 determines the current occupancy of the roadways in the warehouse according to the position information sent by the respective moving carriers 100. The moving carrier 100 receives the roadway occupation in the warehouse sent by the server 200, and requests the server 200 to adjust the planned path according to the roadway occupation in the warehouse.

In some embodiments of the present invention, the server 200 here may be a physical server or a logical server which is formed by virtualizing a plurality of physical servers. The server 200 may also be a server group composed of a plurality of servers capable of connecting and communicating with each other, and various functional modules may be respectively distributed on various servers in the server group.

Figure 3B:
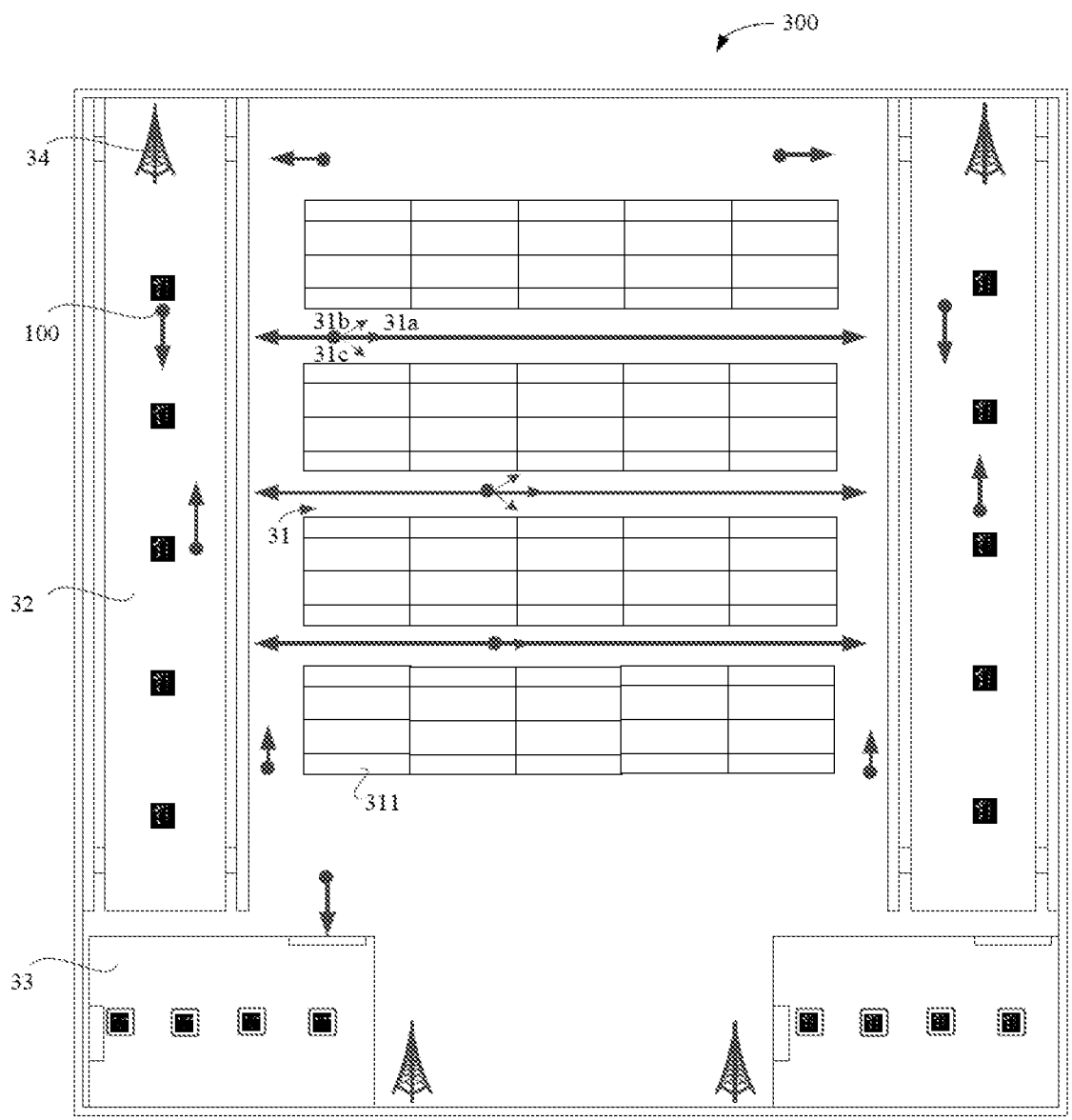
FIG. 3b is a schematic diagram of a moving carrier traveling in a warehouse according to an embodiment of the present invention.

While the moving carrier 100 is moving in the warehouse, various indoor positioning modes may be used to assist in positioning and navigation. Referring to FIG. 3b, which is a schematic diagram of a moving carrier traveling in a warehouse according to an embodiment of the present invention, a warehouse 300 includes a roadway 31, a public area 32, and an operation desk area 33.

The roadway 31 is formed by at least two rows of shelving units 311 placed opposite to each other. There may be a plurality of shelving units on the same side, which are placed side by side. The warehouse 300 may include a plurality of rows of shelving units, and the roadway 31 is formed between any two adjacent rows of shelving units in the plurality of rows of shelving units. Therefore, the plurality of rows of shelving units may form a plurality of roadways 31. The moving carrier 100 may pick and place goods on the shelving units 311 in the roadways 31.

In the roadway 31, in order to better guide the moving carrier 100 to pick and place goods, a reference traveling direction 31a is preset in the roadway 31. When the moving carrier 100 travels along the traveling direction 31a, the moving carrier 100 effectively picks and places goods on the shelving units without touching the shelving units. When the moving carrier 100 deviates from the traveling direction 31a to travel along 31b or 31c in the roadway 31, the moving carrier 100 is likely to have an accident of touching the shelving units.

Figure 3C:
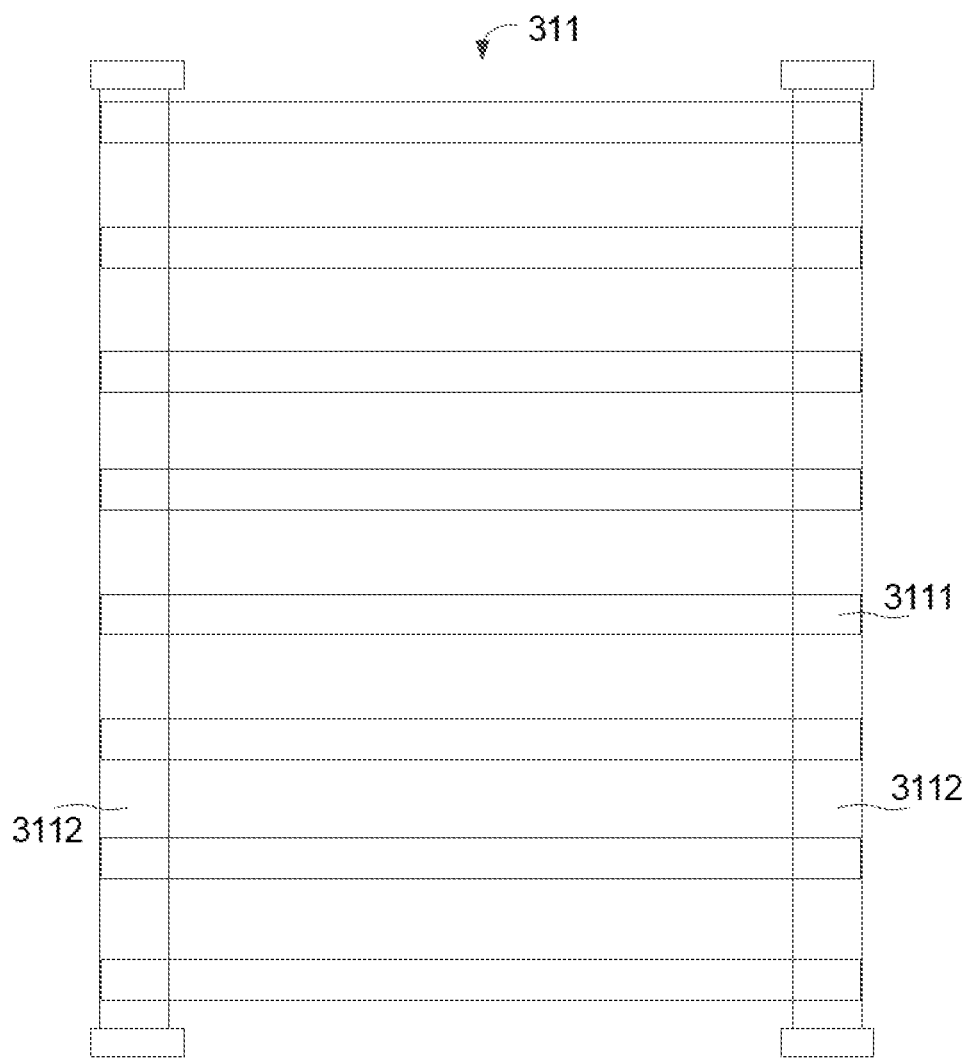
FIG. 3c is a side view of a shelving unit according to an embodiment of the present invention.

In the present embodiment, referring to FIG. 3c, which is a side view of a shelving unit according to an embodiment of the present invention, each shelving unit 311 includes shelving boards 3111 and two shelving unit legs 3112 spaced apart by a preset distance. The shelving boards 3111 are mounted on the two shelving unit legs 3112, the two shelving unit legs 3112 provide a supporting force for the shelving boards 3111 to support the shelving boards 3111. Containers for holding goods may be placed on the shelving boards 3111.

The shelving unit legs 3112 may be constructed from any suitable shape of bracket. For example, referring to FIG. 3d, in the respective shelving units placed side by side on the same side, a top view of the shelving unit legs in each shelving unit is right-angled shape. In some embodiments, the top view of the shelving unit legs in each shelving unit may be any suitable shapes such as an arc, a circle, etc.

The public area 32 is an area where respective moving carriers all pass through during navigation. For example, moving carrier A1 needs to move to a first container on a first shelving unit to pick goods, and moving carrier A2 needs to transport goods in a second container on the first shelving unit to the operation desk area 33. Then, moving carrier A1 and moving carrier A2 both need to pass through the public area 32.

Since a large number of moving carriers frequently appear in a public area, in the present embodiment, in order to improve the navigation safety for each moving carrier in the public area 32, it is necessary to increase a reserved safe distance between the moving carriers. Alternatively, an identifier is set at a critical position or a position which is frequently passed by in the public area 32, so that each moving carrier can accurately identify their respective positions according to the identifier, and so that subsequently, the server can flexibly adjust the traveling direction of each moving carrier and the distance between the moving carriers according to the position of each moving carrier.

In the present embodiment, the identifier includes any suitable form of identifier, such as a QR code, an electronic tag, a bar code, or graphical object.

The operation desk area 33 is an area where moving carriers operate containers or goods. For example, the moving carrier places a transported container or goods at a preset position in the operation desk area 33, or an administrator puts an empty container in the operation desk area 33 for a corresponding moving carrier so that the moving carrier can place the empty container at a corresponding position in a shelving unit. As an example, when the moving carrier reaches the operation desk area 33, a camera of the moving carrier starts to read an identifier of the operation desk area 33 so as to determining its position. Moreover, the moving carrier suspends its operation or executes other command logic according to the determined position. In some embodiments, the identifier is mounted at a preset position in the operation desk area 33, such as at a protective net or a fence of a neighbor operation desk with the operation suspended.

In the present embodiment, the moving carrier may start from the operation desk area 33, pass through the public area 32, and then reach the corresponding roadway 31 after it passes through the public area 32. Alternatively, the moving carrier may start from the roadway 31, pass through the public area 32, and then reach the operation desk area 33 after it passes through the public area 32.

In the present embodiment, the ground of the warehouse 300 is provided with a ground coordinate system XOY, and each shelving unit corresponds to a unique coordinate (x, y, θ), where x is an abscissa, y is an ordinate, and θ is an included angle between an orientation of a robot and a traveling direction of the robot.

In some embodiments, the position of the moving carrier 100 may also be determined by means of other indoor positioning technologies. Referring to FIG. 3b, non-data identifiers are deployed in a grid-pattern on the ground of the warehouse 300. A plurality of positioning base stations 34 are set in the warehouse 300. The moving carrier 100 is equipped with a positioning antenna, which repeatedly and uninterruptedly sends data frames using ultra wideband (UWB) pulses. Each positioning base station 34 receives the UWB pulses. The positioning base station 34 uses a high-sensitivity short pulse detector to measure the time when a data frame of a positioning tag arrives at a receiver antenna. With reference to the calibration data sent by the positioning antenna, server 200 determines the difference between the time periods it takes to arrive at different positioning base stations from the positioning antenna. Moreover, server 200 calculates the position of the positioning antenna, i.e. the position of the moving carrier 100, by using a three-point positioning technique and an optimization algorithm. The positioning base station 34 may use a time difference of arrival (TDOA) algorithm to achieve position determination.

It will be appreciated that the moving carrier 100 may also use other positioning methods to perform positioning and navigation, which is not limited to those provided in the embodiments of the present invention.

An embodiment of the present invention provides a navigation method, which is applied to a moving carrier equipped with a sensor, wherein the sensor is mounted at a suitable position in the moving carrier to collect sensor data. The sensor here may be any suitable type of sensor, such as various types of motion sensors, image sensors, or wireless sensors. The motion sensors may include, for example, inertial measurement units (IMUs), gyroscopes, magnetometers, accelerometers, or speedometers, etc. The image sensor may be configured as a camera of any shape for shooting an image. The wireless sensor is installed in the moving carrier, communicates with an external wireless base station or a wireless system, and realizes positioning of the moving carrier based on a wireless technology.

The moving carrier may travel within a preset space. The preset space is the range of space where the moving carrier moves around. The definition of the preset space may be different for different service scenarios. For example, the preset space is a warehouse for a warehousing service scenario. The preset space is the sum of individual indoor spaces separated by walls for a home service scenario. In the present embodiment, the preset space includes a roadway formed by at least two rows of shelving units placed opposite to each other.

Figure 4A:
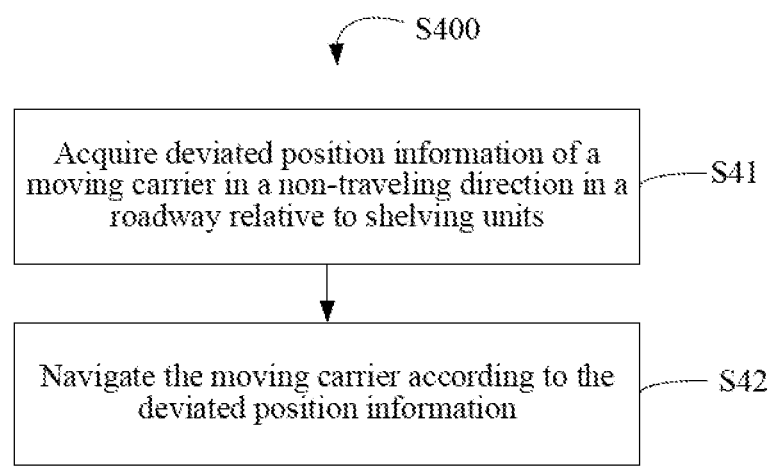
FIG. 4a is a schematic flowchart of a navigation method according to an embodiment of the present invention.

FIG. 4a is a schematic flowchart of a navigation method according to an embodiment of the present invention. As shown in FIG. 4a, a navigation method S400 includes the following steps.

At S41, deviated position information of a moving carrier in a non-traveling direction in a roadway relative to shelving units is acquired.

At S42, the moving carrier is navigated according to the deviated position information.

In the present embodiment, the non-traveling direction is a direction in which the moving carrier deviates from the traveling direction. When the moving carrier continues to travel along a non-traveling direction in the roadway, the moving carrier is prone to misalignment of the shelving units and therefore unsuccessfully picks and places goods, or, the moving carrier tends to touch the shelving units to cause a safety accident.

In the present embodiment, the deviated position information is the amount of deviation of the moving carrier relative to the shelving units. The deviated position information includes a deviation angle and/or a deviation distance. The deviation angle is the angle of rotation of the moving carrier relative to the shelving units, when the moving carrier is in the non-traveling direction. The deviation distance is the distance that the moving carrier in the non-traveling direction between relative to the shelving units. When the moving carrier deviates from the traveling direction and moves in the non-traveling direction, the movement of the moving carrier is corrected, according to the deviated position information, to make the moving carrier move in the traveling direction. As a result, the navigation safety and reliability of the moving carrier in the roadway are improved.

When being navigated in the roadway, unlike in the conventional technology which needs to perform positioning by scanning a QR code on the ground or a QR code of a shelving unit for navigation, the moving carrier of in the present embodiment calculates in real time deviated position information in a non-traveling direction in the roadway relative to the shelving units. Furthermore, the moving carrier is navigated according to the deviated position information, for example, the moving carrier travels into the preset traveling direction according to the deviated position information. As an example, when an deviation angle of the moving carrier relative to the shelving units is 8 degrees, the moving carrier rotates clockwise by 8 degrees. Further, when an deviation distance that the moving carrier deviates leftwards relative to the shelving units is 10 cm, the moving carrier moves rightwards by 10 cm. Therefore, the moving carrier returns to the traveling direction and heads rightly for the traveling direction.

For another example, the moving carrier acquires current position information, and the moving carrier performs fusion processing on the deviated position information and the current position information to obtain fused position information. Then, the moving carrier is navigated according to the fused position information and acquired target position information. The moving carrier scans a QR code on the shelving unit or on the ground, and the current position information may be parsed from coordinate information encapsulated in the QR code. Alternatively, the moving carrier calculates the current position information according to a preset motion equation in combination with motion information sent by an inner sensor, such as speed. Still Alternatively, the moving carrier receives the current position information sent by an outer sensor. The inner sensor comprises a gyroscope or an odometer, etc. The received current position estimation information may be obtained by UWB positioning information sent by a UWB device and received by the moving carrier.

According to the method provided by the present embodiment, the moving carrier is navigated based on the deviated position information in the non-traveling direction. The moving carrier is prevented from hitting the shelving units, and, besides, can be reliably navigated in the roadway.

There are numerous ways to calculate the deviated position information. For example, the deviated position information is detected by a distance sensor, or obtained by pre-constructing a mathematical model and inputting current environmental information of the moving carrier into the mathematical model, or obtained by a machine vision algorithm, etc.

Figure 4B:
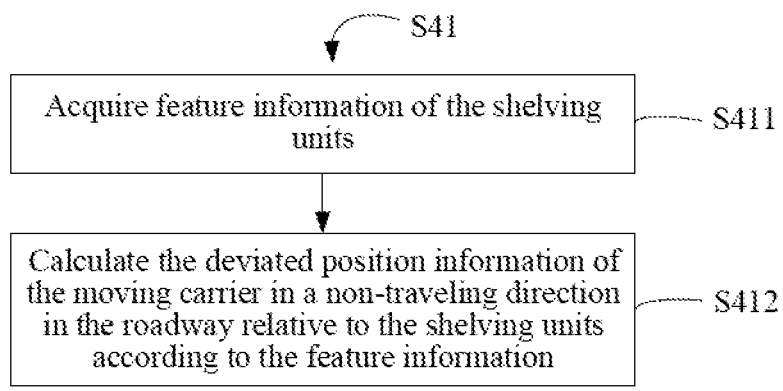

For example, in some embodiments, referring to FIG. 4b, which is a schematic flowchart of S41 in FIG. 4a, S41 includes the following steps.

At S411, feature information of the shelving units is acquired.

At S412, the deviated position information of the moving carrier in a non-traveling direction in the roadway relative to the shelving units is calculated according to the feature information.

In the present embodiment, the shelving unit may include a plurality of pieces of feature information. The feature information is used to identify different parts of each shelving unit. For example, one piece of feature information may be used to identify a shelving board of the shelving unit, and another piece of feature information may be used to identify a shelving unit leg of the shelving unit.

In the present embodiment, the feature information may be collected by different types of sensors, such as a camera, a laser radar, or other suitable sensors. That is, a camera, a laser radar, or other suitable sensors may be used to collect corresponding feature information. For example, considering that shelving boards are located at relatively high positions and there are a relatively large number of various types of objects on the shelving boards, if the laser radar is used for collection, since there are a relatively large number of clutter in a laser image collected by the laser radar and the image processing is relatively complicated, the camera may be selected to collect the feature information of the shelving boards in consideration of efficiency. For another example, considering that the positions of the shelving unit legs of the shelving unit are relatively low and there are a relatively small number of various types of objects under the shelving unit legs, it is more efficient to use the laser radar to collect the feature information of the shelving unit legs than to use the camera to collect the feature information of the shelving unit legs. It will be appreciated that there is no limitation to acquiring the feature information of the shelving units and that this is only an additional illustration.

In the present embodiment, the feature information of the shelving units is predetermined. For example, a reference object is selected on a shelving unit, and feature information of the reference object is the feature information of the shelving unit. Then the moving carrier may calculate deviated position information in a non-traveling direction and relative to the shelving units in the roadway according to the feature information.

In some embodiments, as explained above, the selection of the reference object may be predefined, and the feature information is obtained by a sensor and sent to the moving carrier by the sensor. The sensor may or may not be mounted on the moving carrier, and the feature information is transmitted to the moving carrier by the sensor via wireless communication or wired communication.

The sensor is configured with a coordinate system. For example, when the sensor is a camera, the camera is configured with a world coordinate system, a camera coordinate system, an image coordinate system, and a pixel coordinate system. In some embodiments, the world coordinate system of the camera coincides or may not coincide with the camera coordinate system. When the world coordinate system of the camera does not coincide with the camera coordinate system, a physical point is converted between the world coordinate system and the camera coordinate system by a conversion matrix between the world coordinate system and the camera coordinate system.

For example, when the camera scans an identifier laid on the ground, the identifier encapsulating coordinate information, the moving carrier calculates a conversion matrix between the identifier and the moving carrier according to the coordinate information and a camera model, and then obtains position information of the moving carrier in the world coordinate system according to the conversion matrix.

For example, when the sensor is a laser radar, the laser radar is configured with a world coordinate system and a polar coordinate system. In some embodiments, the world coordinate system and the polar coordinate system of the laser radar coincide or may not coincide. When the world coordinate system of the laser radar does not coincide with the polar coordinate system, a physical point is converted between the world coordinate system and the polar coordinate system by a conversion matrix between the world coordinate system and the polar coordinate system.

It will be appreciated that built-in parameters or matrices between the various coordinate systems described above are preset.

In some embodiments, when the moving carrier calculates deviated position information of the moving carrier in a non-traveling direction and relative to the shelving units in the roadway according to the feature information, it may calculate deviated position information according to the coordinate information of the feature information in the coordinate system of the sensor. For example, since the positions of the shelving units and the heights of the shelving boards are fixed, when the sensor is a camera or a laser radar, and when the feature information is feature information of an edge of a shelving board, the moving carrier may calculate deviated position information according to coordinate information of the edge feature information in a coordinate system of the camera or a coordinate system of the laser radar. The edge feature of the shelving board means that, the edge of the shelving unit will have a significant gradient difference in an image shot by the camera (for example, light shines on the shelving unit so that the shelving unit is bright, while the background is dark, and there will be a significant boundary line at the edges of the shelving unit), image feature information of the edge feature may be extracted from the shot image by using a Canny algorithm, and the image feature information is taken as the edge feature information.

As another example, when the sensor is a camera or a laser radar and the feature information is leg feature information of shelving unit legs, the moving carrier may calculate deviated position information according to coordinate information of the leg feature information in a coordinate system of the camera or the laser radar.

In some embodiments, the operation principle of the present embodiment is described in detail by taking an example of the feature information being the edge feature information.

Since the coordinate information of the edge feature information in the coordinate system of the sensor is associated with the mounting position of the sensor in the moving carrier, when the moving carrier calculates deviated position information according to the coordinate information of the feature information in the coordinate system of the sensor, the moving carrier firstly acquires attitude information of the sensor mounted on the moving carrier. The attitude information includes a mounting height and a pitch angle of the camera mounted on the moving carrier. In the present embodiment, the attitude information is pre-configured, and when calculating deviated position information, the moving carrier may directly access a database for acquisition.

Secondly, the moving carrier calculates deviated position information according to the attitude information and the coordinate information of the edge feature information in the coordinate system of the sensor. For example, the moving carrier calculates, according to a camera model of the camera and the coordinate information of the edge feature information in the coordinate system, an edge straight line equation of the edge feature information in the camera model. The camera model includes in-camera parameters.

Next, the moving carrier calculates the deviated position information according to the camera model, the edge straight line equation, the mounting height, and the pitch angle.

For example, in the present embodiment, when the height of the shelving board is known, and when the shelving board is parallel to the ground and the attitude of the camera is pre-configured, the moving carrier may calculate, according to mathematical derivation of solid geometry, a relative distance of the camera to the edge of the shelving board as well as an included angle between the camera and the edge of the shelving board, the relative distance being perpendicular to the edge of the shelving board and being in a horizontal direction, the included angle being in the horizontal direction.

For example, firstly, the moving carrier selects a reference point P in the edge feature information, and sets coordinate information of the reference point P in the coordinate system as (x, y, z). Secondly, according to a positional relationship between the edge feature information and the coordinate system, the moving carrier derives a first equation between x, the mounting height, the pitch angle, and the deviated position information, and the moving carrier also derives a second equation between y, the mounting height, and the pitch angle. Then, according to an equation relationship between the camera model and the edge straight line equation, the moving carrier derives a third equation in which x, y, and z are put in a single equation. Then, the moving carrier combines the first equation, the second equation, and the third equation to obtain a fourth equation. Finally, the moving carrier calculates the deviated position information according to the fourth equation.

The derivation process is described in detail below in conjunction with FIG. 5, as follows.

Figure 5:
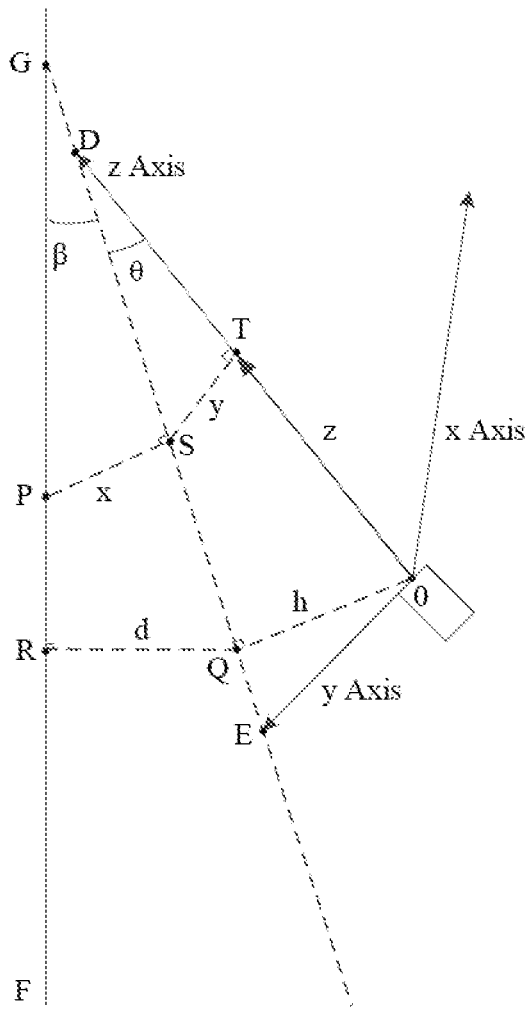
FIG. 5 is a three-dimensional space coordinate system of a shooting device established by taking shelving board edges as feature information according to an embodiment of the present invention.

Referring to FIG. 5, a three-dimensional space coordinate system of a camera is established by taking shelving board edges as feature information according to an embodiment of the present invention. The three-dimensional space coordinate system is established by taking the camera as origin O. The direction of the optical axis is taken as axis z. The optical axis intersects with the ground at point D. A line perpendicular to the ground is drawn through origin O and intersects with the ground at point Q. A line perpendicular to OD is drawn through origin O and drawn in plane ODQ, and this line intersects with the ground at point E. OE is defined as axis y. A line perpendicular to plane zOy is drawn through origin O, and this line is taken as axis x. As such, the coordinate system is established.

In the present embodiment, OQ is the mounting height h of the camera mounted on the moving carrier, and angle $\angle ODQ=\theta$ is a pitch angle $\theta$ of the camera mounted on the moving carrier.

A pixel coordinate system of the camera is set as uOv. According to the camera model of the camera, there is:

$$u = f_x \frac{x}{z} + p_x \quad (1)$$

$$v = f_y \frac{y}{z} + p_y \quad (2)$$

where (u, v) represents coordinate information of the pixel coordinate system, $$f_x = \frac{f}{dx}, f_y = \frac{f}{dy},$$

where f is a focal length. The focal length is the distance from the origin of the camera coordinate system to the image plane, dx and dy are respectively physical dimensions of each pixel in the abscissa and ordinate directions of the image plane, x, y, and z are respectively coordinate values in the camera coordinate system, and $p_x$ and $p_y$ are coordinates of the origin of the image coordinate system in the pixel coordinate system.

Firstly, the moving carrier calculates, according to the camera model of the camera and the coordinate information of the edge feature information in the coordinate system, an edge straight line equation v=mu+n of the edge feature information in the camera model.

Secondly, the moving carrier calculates angle $\beta$ and distance d according to the mounting height h, the pitch angle $\theta$, and the edge straight line equation v=mu+n. Angle $\beta$ is an include angle between a projection of the camera on the shelving board plane and the shelving board edge. Distance d is the vertical distance from the projection of the camera on the shelving board plane to the shelving board edge. The included angle $\beta$ is an deviation angle, and the vertical distance d is an deviation distance.

For example, P is set as any point on the shelving board edge GF. Space coordinates of P in the camera coordinate system of the camera are (x, x, x). P' is the pixel point of point P in the pixel coordinate system, and coordinates of P' are (u, v). A line perpendicular to the shelving board edge GF is drawn through point Q and intersects with the shelving board edge GF at point R. The distance between R and Q is d.

From FIG. 5, a relationship between (x, y, z) is derived:

$$\sin(\theta) = \frac{h}{z+DT}, \tan(\theta) = \frac{y}{DT} \quad (3)$$

Equations in (3) are combined to obtain:

$$y = \frac{h - z\sin(\theta)}{\cos(\theta)} \quad (4)$$

$$\sin(\beta) = \frac{d}{GS+SQ}, \tan(\beta) = \frac{x}{GS} \quad (5)$$

Equations in (5) are combined to obtain:

$$x = \frac{d - SQ\sin(\beta)}{\cos(\beta)} \quad (6)$$

$$SQ = DQ - DS = \frac{h}{\tan(8)} - \frac{y}{\sin(\theta)} \quad (7)$$

Equations in (4) and (7) are combined to obtain:

$$SQ = \frac{z - h\sin(\theta)}{\cos(\theta)} \quad (8)$$

Equations in (6) and (8) are combined to obtain:

$$x = \frac{d\cos(\theta) - z\sin(\beta) + h\sin(\theta)\sin(\beta)}{\cos(\theta)\cos(\beta)} \quad (9)$$

(1) and (2) are substituted into the straight line equation v=mu+n to obtain:

$$f_y \frac{y}{z} + p_y = m\left(f_x \frac{x}{z} + p_x\right) + n \quad (10)$$

(4) and (9) are substituted into (10) to obtain:

$(f_y \sin(\theta)\cos(\beta) + n \cos(\theta)\cos(\beta) - mf_x \sin(\beta) - p_y \cos(\theta) \cos(\beta) + mp_x \cos(\theta)\cos(\beta))z + mf_x h \sin(\theta)\sin(\beta) + mf_x \cos(\theta) - f_y h \cos(\beta) = 0$ (11)

In the present embodiment, equation (9) is a first equation, i.e., the first equation expresses the relationship between x, the mounting height, the pitch angle, and the deviated position information. Equation (4) is a second equation, i.e., the second equation expresses the relationship between y, the mounting height, and the pitch angle. Equation (10) is a third equation, i.e., the third equation where x, y, and z are put in a single equation. Equation (11) is a fourth equation.

Since point P is any point on the straight line of the shelving board edge, equation (11) should hold for any value of z. Thus, the following equations are obtained:

$$\begin{cases} f_y\sin(\theta)\cos(\beta) + n\cos(\theta)\cos(\beta) - mf_x\sin(\beta) - p_y\cos(\theta)\cos(\beta) + \\ mp_x\cos(\theta)\cos(\beta) = 0 \\ mf_x h\sin(\theta)\sin(\beta) + mf_x d\cos(\theta) - f_y h\cos(\beta) = 0 \end{cases} \quad (8)$$

Finally:

$$\begin{cases} \beta = \tan^{-1}\left(\dfrac{f_y\sin(\theta) + n\cos(\theta) - p_y\cos(\theta) + mp_x\cos(\theta)}{mf_x}\right) \\ d = \dfrac{f_y h\cos(\beta) - mf_x h\sin(\theta)\sin(\beta)}{mf_x\cos(\theta)} \end{cases} \quad (6)$$

Therefore, with the above mathematical derivation, the deviation angle and the deviation distance may be calculated. As a result, the moving carrier in a non-traveling direction can be accurately positioned. Position information of a non-traveling position can be obtained. Position information of a traveling position of the moving carrier in the traveling direction can be obtained by means of other positioning approaches. The position information of the non-traveling position and the traveling position are combined, so as to ensure that the moving carrier does not misalign with and thus collide with the shelving units but approaches to a target position for picking and placing goods or leaves the roadway reliably and safely.

In the present embodiment, when the moving carrier reaches a place where goods are picked and placed, the moving carrier starts to read a QR code on the shelving unit or other identifier for positioning. Then, the moving carrier performs an accurate operation on the target container according to the position information in the read identifier.

In some embodiments, unlike the above embodiments in which the feature information is edge feature information of a shelving board, the feature information may also be leg feature information of shelving unit legs. By taking an example of the feature information being leg feature information, the operation principle of the present embodiment is described in detail.

In the present embodiment, the moving carrier is equipped with a front sensor and a rear sensor. The front sensor may acquire leg feature information of the shelving unit legs which are faced by the moving carrier in the traveling direction. The rear sensor may acquire leg feature information of the shelving unit legs which the moving carrier has passed by.

Figure 6A:
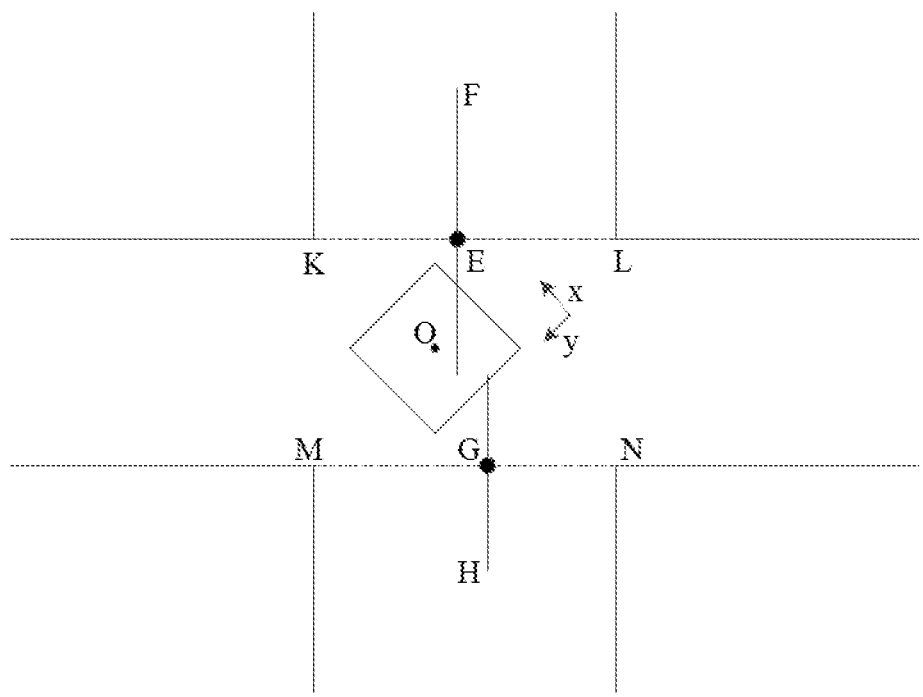
FIG. 6a is a schematic diagram of leg feature information of a shelving unit leg according to an embodiment of the present invention.

Referring to FIG. 6a, which is a schematic diagram of leg feature information of one type of shelving unit legs according to an embodiment of the present invention. With the front sensor, the moving carrier obtains first leg feature information of first shelving unit leg K and second leg feature information of second shelving unit leg L, wherein the moving carrier in the traveling direction is moving away from first shelving unit leg K and second shelving unit leg L. Moreover, first shelving unit leg K and second shelving unit leg L are located on different rows of shelving units and are directly opposite to each other.

With the rear sensor, the moving carrier obtains third leg feature information of third shelving unit leg M and fourth leg feature information of fourth shelving unit leg N, wherein the moving carrier in the traveling direction are moving away from third shelving unit leg M and fourth shelving unit leg N. Moreover, third shelving unit leg M and fourth shelving unit leg N are located on different rows of shelving units and are directly opposite to each other.

In the present embodiment, when calculating deviated position information, the moving carrier firstly determines first leg feature information of first shelving unit leg K and second leg feature information of second shelving unit leg L, wherein first shelving unit leg K and second shelving unit leg L are faced by the moving carrier in the traveling direction. Then, the moving carrier calculates the deviated position information according to respective coordinate information of the first leg feature information and the second leg feature information in the coordinate system of the sensor. For example, a line segment determined by the first shelving unit leg and the second shelving unit leg is a first line segment. For example, the first line segment is KL. First straight line EF perpendicular to first line segment KL is drawn through midpoint E of first line segment KL. A line segment determined by third shelving unit leg M and fourth shelving unit leg N is second line segment MN. Second straight line GH perpendicular to second line segment MN is drawn through midpoint G of second line segment MN.

In FIG. 6a, first straight line EF and second straight line GH are purposely marked separately in FIG. 6a in order to visually distinguish between them and conveniently mark them. It will be appreciated that first straight line EF and second straight line GH may or may not coincide.

Coordinate information of the first leg feature information of first shelving unit leg K in the coordinate system is $(x_k, y_k)$, the second leg feature information of second shelving unit leg L is $(x_1, y_1)$, the third leg feature information of third shelving unit leg M is $(x_m, y_m)$, and the fourth leg feature information of fourth shelving unit leg N is $(x_n, y_n)$.

Then, the moving carrier calculates a deviation angle according to respective coordinate information of the first leg feature information and the second leg feature information in the coordinate system of the sensor. For example, the deviation angle is:

$$\theta = \tan^{-1}\dfrac{x_1 - x_k}{y_1 - y_k}.$$

Alternatively, in some embodiments, the moving carrier may also calculate a deviation angle according to respective coordinate information of the third leg feature information and the fourth leg feature information in the coordinate system of the sensor. For example, the deviation angle is:

$$\theta = \tan^{-1}\dfrac{x_n - x_m}{y_n - y_m}.$$

Alternatively, in some embodiments, the moving carrier calculates a deviation angle according to respective coordinate information of the first leg feature information and the third leg feature information in the coordinate system of the sensor. For example, the deviation angle is:

$$\theta = \pi - \tan^{-1} \frac{y_k - y_m}{x_k - x_m}.$$

Alternatively, in some embodiments, the moving carrier calculates a deviation angle according to respective coordinate information of the second leg feature information and the fourth leg feature information in the coordinate system of the sensor. For example, the deviation angle is:

$$\theta = \pi - \tan^{-1} \frac{y_l - y_n}{x_l - x_n}.$$

Alternatively, any two or three or four values are selected from the above four deviation angles and then be averaged. The average value is taken as the deviation angle.

In some embodiments, the moving carrier may also calculate an deviation distance. For example, the moving carrier calculates a first centerline equation of the first straight line in the coordinate system according to the respective coordinate information of the first leg feature information and the second leg feature information in the coordinate system of the sensor. Then, the moving carrier calculates a first distance from the origin of the coordinate system to the first straight line according to the first centerline equation, and takes the first distance as the deviated position information.

For example, the slope of first line segment KL is $$k_{k1} = \frac{y_l - y_k}{x_l - x_k},$$

the midpoint of first line segment KL is $$\left( \frac{x_l + x_k}{2}, \frac{y_l + y_k}{2} \right),$$

the first centerline equation perpendicular to first line segment KL and through the midpoint of first line segment KL is $$y = -\frac{1}{k_{kl}} * x + \left( \frac{y_l + y_k}{2} + \frac{1}{k_{kl}} * \frac{x_l + x_k}{2} \right),$$

the origin of the coordinate system is (0, 0), and the distance from the origin of the coordinate system to the first centerline equation is $$d = \frac{\frac{y_l + y_k}{2} + \frac{1}{k_{kl}} * \frac{x_l + x_k}{2}}{\sqrt{k_{kl}^{-2} + 1^2}}.$$

In general, since $k_{kl}$ is much greater than 1, $$\frac{1}{k_{kl}}$$

is approximately equal to 0, so $$d = \frac{y_l + y_k}{2} + \frac{1}{k_{kl}} * \frac{x_l + x_k}{2}.$$

Unlike the above embodiments, when calculating an deviation distance, the moving carrier firstly determines third leg feature information of a third shelving unit leg and fourth leg feature information of a fourth shelving unit leg, wherein the moving carrier in the traveling direction is moving away from the third shelving unit leg and the fourth shelving unit leg. Then, the moving carrier calculates the deviated position information according to respective coordinate information of the third leg feature information and the fourth leg feature information in the coordinate system of the sensor. For example, the moving carrier calculates a second centerline equation of the second straight line in the coordinate system according to the respective coordinate information of the third leg feature information and the fourth leg feature information in the coordinate system of the sensor, calculates a second distance from the origin of the coordinate system to the second straight line according to the second centerline equation, and takes the second distance as the deviated position information.

For example, the slope of second line segment MN is $$k_{mn} = \frac{y_n - y_m}{x_n - x_m},$$

the midpoint of second line segment MN is $$\left( \frac{x_n + x_m}{2}, \frac{y_n + y_m}{2} \right),$$

an equation or a straight line perpendicular to second line segment MN through the midpoint of second line segment MN is $$y = -\frac{1}{k_{mn}} * x + \left( \frac{y_n + y_m}{2} + \frac{1}{k_{mn}} * \frac{x_n + x_m}{2} \right),$$

the origin of the coordinate system is (0, 0), and the distance from the origin of the coordinate system to the second centerline equation is $$d = \frac{\frac{y_n + y_m}{2} + \frac{1}{k_{mn}} * \frac{x_n + x_m}{2}}{\sqrt{k_{mn}^{-2} + 1^2}}.$$

In general, since $k_{mn}$ is much greater than 1, $$\frac{1}{k_{mn}}$$

is approximately equal to 0, so $$d = \frac{y_n + y_m}{2} + \frac{1}{k_{mn}} * \frac{x_n + x_m}{2}.$$

In some embodiments, the moving carrier may also average the second distance and the first distance and take the average value as the deviated position information.

In general, when the moving carrier is navigated in the roadway, the method set forth in the above various embodiments can be used to calculate deviated position information in the non-traveling direction in the roadway and relative to the shelving units. Furthermore, a current position of the moving carrier in the traveling direction can also be accurately calculated, so as to subsequently perform navigation by combining the current position with an acquired target position.

Therefore, in some embodiments, the moving carrier may also determine current coordinates in the traveling direction. The current coordinates are coordinates corresponding to the current position of the moving carrier in the traveling direction. For example, referring to FIG. 6b, the origin of the moving carrier is set as point O, and a line perpendicular to a straight line of a reference traveling direction is drawn through origin O and intersects at point S. The straight line in the reference traveling direction is a straight line perpendicular to straight line AB drawn through midpoint R of straight line AB, or it is a straight line perpendicular to straight line CD drawn through midpoint T of straight line CD. A line perpendicular to straight line AC is drawn through origin O and intersects at point U. A line perpendicular to straight line BD is drawn through origin O and intersects at point V.

In the present embodiment, the coordinate information of point S is the current coordinates in the traveling direction of the moving carrier. In addition, the moving carrier has passed by both shelving units CC' and DD', and the moving carrier is going to pass shelving units AA' and BB'. It can also be seen from FIG. 6b that the moving carrier has passed by both part CU of shelving unit CA and part DV of shelving unit DB but the moving carrier has not gone past part UA of shelving unit CA or part VB of shelving unit DB.

After the moving carrier determines the current coordinates in the traveling direction, the moving carrier performs fusion processing on the current coordinates and calculated or received current position estimation information in the roadway to obtain fused position information. Then, the moving carrier performs navigation according to the fused position information and acquired target position information. The calculated current position estimation information may be calculated from motion data collected by an inner sensor of the moving carrier in combination with a preset motion equation.

Alternatively, in some embodiments, after determining the current coordinates in the traveling direction, the moving carrier is navigated in the roadway according to the current coordinates and the acquired target location information.

There are various methods for determining the moving carrier's current coordinates in the traveling direction. For example, in some embodiments, the moving carrier's entrance coordinates in the traveling direction when the moving carrier enters the entrance of the roadway are firstly determined. For example, still referring to FIG. 6b, which is a schematic diagram of a moving carrier traveling in a roadway according to an embodiment of the present invention, it is assumed that shelving units CC' and DD' are shelving units at the beginning of the roadway. When entering the roadway, the moving carrier firstly needs to pass by shelving units CC' and DD'. Straight line RT where the traveling direction lies intersects with straight line C'D' at point W. The coordinates of point W are the entrance coordinates of the moving carrier in the traveling direction.

Secondly, a movement length that the moving carrier has moved in the traveling direction in the roadway is calculated, i.e. a line segment SW is the movement length that the moving carrier has moved in the traveling direction in the roadway. There are various methods for calculating the movement length that the moving carrier moves in the traveling direction in the roadway. For example, in some embodiments, there are a plurality of shelving units on the same side, and each of these plurality of shelving units has the same preset shelving unit length. For example, still referring to FIG. 6b, shelving units on the left side of the moving carrier include shelving units C'C, CA, and AA', and shelving units on the right side of the moving carrier include shelving units D'D, DB, and BB'. The respective shelving unit lengths of shelving units C'C, CA, and AA' are the same and are pre-configured. Similarly, the respective shelving unit lengths of shelving units D'D, DB, and BB' are also the same and pre-configured.

Since the moving carrier is currently in a roadway area formed between shelving units CA and DB, shelving unit CA or DB is a current shelving unit. It will be appreciated that "current shelving unit" may vary depending on the current location of the moving carrier. For example, the moving carrier is currently in a roadway area formed between shelving units CA and DB at time t1, so shelving unit CA or DB is the current shelving unit. The moving carrier is currently in a roadway area formed between shelving units AA' and BB' at time t2, so shelving unit AA' or BB' is the current shelving unit.

A position in the traveling direction where the moving carrier starts to enter the current shelving unit is a starting position, and a position in the traveling direction and corresponding to the current position is a final position. Since the current shelving unit is shelving unit CA or DB, a position where the moving carrier in the traveling direction starts to enter shelving unit CA or DB is point T. That is, point T is the starting position. Since the current position of the moving carrier is point O, a position in the traveling direction and corresponding to current position point O is the position of point S. That is, point S is the final position.

Therefore, when calculating the moving carrier's movement length in the traveling direction in the roadway, the number of shelving units on the same side through which the moving carrier passes in the roadway is firstly acquired. For example, the moving carrier passes by shelving unit C'C in the roadway, or to say, it passes by shelving unit D'D in the roadway. The number of shelving units on the same side which the moving carrier passes by in the roadway is 1. Secondly, a relative length that the moving carrier has moved in the traveling direction when it passes by the current shelving unit is determined. The relative length is the absolute value of the difference between the final position and the starting position. That is, the relative length is the length $\Delta x$ of segment ST. Then, the number of shelving units is multiplied by the shelving unit length to obtain a multiplication result. That is, when the shelving unit length is C and the number of shelving unit is n, the multiplication result is $P=f\ C*n$. In the present embodiment, $P=C*1=C$. Finally, the multiplication result and the relative length are added to obtain a sum, and the sum is taken as the movement length, i.e. $X1=P+\Delta x$.

As described above, when the movement length is calculated, the moving carrier's current coordinates in the traveling direction are calculated finally according to the entrance coordinates and the movement length. That is, the x-axis value, y-axis value, or z-axis value of the entrance coordinates is added to the movement length to form a new coordinate value, and the new coordinate value is taken as the moving carrier's current coordinate in the traveling direction.

Generally speaking, since the shelving unit length of the shelving units on the same side is known, the number of shelving units on the same side through which the moving carrier passes may be calculated according to the following formula:

$$x=x_0+nc+\Delta x$$

where x is the current coordinate of the traveling direction, $x_0$ is the entrance coordinate of the roadway in the traveling direction, n is the number of shelving units on the same side through which the moving carrier passes, c is the shelving unit length of one shelving unit in the traveling direction, and $\Delta x$ is the relative length that the moving carrier has moved in the traveling direction when it passes by the current shelving unit.

Therefore, the moving carrier's current coordinates in the traveling direction may be obtained according to the above formula.

In some embodiments, there are various methods for determining the relative length that the moving carrier has moved in the traveling direction when it passes by the current shelving unit. For example, still referring to FIG. 6b, two first lateral shelving units which are adjacent to the current shelving unit and located on the same side with the current shelving unit are calculated. For example, the current shelving unit is shelving unit CA, shelving units C'C is adjacent to shelving unit CA, and shelving unit A'A is also adjacent to shelving unit CA. Therefore, shelving unit C'C is a first lateral shelving unit, and shelving unit A'A is also a first lateral shelving unit.

Secondly, a first side straight line equation determined by the two first lateral shelving unit is calculated according to the leg feature information of the respective shelving unit legs of the two first lateral shelving units. For example, a first side straight line determined by shelving units A'A and C'C is CA. The leg feature information of the shelving unit leg of the first lateral shelving unit is ($x_a$, $y_a$), and the leg feature information of the shelving unit leg of the other first lateral shelving unit is ($x_c$, $y_c$), then:

The slope of line segment AC is $$k_{ac}=\frac{y_a-y_c}{x_a-x_c},$$

and a first side straight line equation of line segment AC is $$y=k_{ac}*x+(y_a-k_{ac}*x_a) \quad (12)$$

Then, coordinate information of a first perpendicular point is determined according to the first side straight line equation and coordinates of the coordinate system's origin. The first perpendicular point is a point at which a line perpendicular to the first side straight line and goes through the origin intersects with the first side straight line. For example, point U is the first perpendicular point.

A first perpendicular line equation perpendicular to AC through point $$y=-\frac{1}{k_{ac}*x} \quad (13)$$

The coordinate information ($x_e$, $y_e$) of point U at which the perpendicular line drawn through point O intersects with line segment AC may be obtained by combining straight line equations (12) and (13).

Finally, a first lateral distance is calculated, the first lateral distance is between the coordinate information of the first perpendicular point and the leg feature information of the first lateral shelving unit from which the moving carrier is moving away. The first lateral distance is taken as the relative length. In the present embodiment, shelving units AA' and CC' are both the first lateral shelving units on the same side. Since the moving carrier advances along the traveling direction, shelving unit AA' is a shelving unit the moving carrier in the traveling direction faces, and shelving unit CC' is a shelving unit from which the moving carrier moves away in the traveling direction.

Therefore, the moving carrier calculates a distance $\Delta x1=\sqrt{(y_e-y_c)^2+(x_e-x_c)^2}$ between line segment UC according to coordinate information U ($x_e$, $y_e$) of the first perpendicular point and ($x_c$, $y_c$). That is, the first lateral distance is the relative length $\Delta x1$.

Unlike the method for calculating the relative length in the above embodiments, in some embodiments, when determining the relative length that the moving carrier has traveled in the traveling direction when it passes by the current shelving unit, the moving carrier firstly calculates two second lateral shelving units which are adjacent to the current shelving unit and located on the same side. The second lateral shelving units and the first lateral shelving units are located on different sides and opposite to each other. For example, the current shelving unit is shelving unit DB, and shelving units D'D and BB' are both the second lateral shelving units. Shelving units D'D and BB' are both adjacent to shelving unit DB, shelving units D'D and C'C are directly opposite to each other, and shelving units BB' and AA' are directly opposite to each other.

Secondly, a second side straight line equation determined by the two second lateral shelving units is calculated according to the leg feature information of the respective shelving unit legs of the two second lateral shelving units. For example, a second side straight line determined by shelving units D'D and B'B is DB. The leg feature information of the shelving unit leg of the second lateral shelving unit is ($x_b$, $y_b$), and the leg feature information of the shelving unit leg of the other first lateral shelving unit is ($x_d$, $y_d$), then:

The slope of line segment BD is $$k_{bd}=\frac{y_b-y_d}{x_b-x_d},$$

and a second side straight line equation of line segment BD is $$y=k_{bd}x+(y_b-k_{bd}*x_b) \quad (14)$$

Then, coordinate information of a second perpendicular point is determined according to the second side straight line equation and coordinates of the coordinate system's origin. The second perpendicular point is a point at which a line perpendicular to the second side straight line and goes through the origin intersects with the first side straight line. For example, point V is the second perpendicular point.

A first perpendicular line equation perpendicular to BD through point O is $$y = -\frac{1}{k_{bd}} * x \qquad (15)$$

By combining straight line equations (14) and (15), the coordinate information ($x_g$, $y_g$) of point V at which a perpendicular line drawn through point O intersects with line segment BD may be obtained.

Finally, a second lateral distance between the coordinate information of the second perpendicular point and the leg feature information of the second lateral shelving unit from which the moving carrier moves away is calculated. The second lateral distance is taken as the relative length. In the present embodiment, shelving units DD' and BB' are both the second lateral shelving units on the same side. Since the moving carrier advances along the traveling direction, shelving unit BB' is a shelving unit faces the moving carrier in the traveling direction, and shelving unit DD' is a shelving unit from which the moving carrier moves away in the traveling direction.

Therefore, the moving carrier calculates a distance $\Delta x2 = \sqrt{(y_g-y_d)^2+(x_g-x_d)^2}$ of line segment VD according to coordinate information V ($x_g$, $y_g$) of the second perpendicular point and ($x_d$, $y_d$). That is, the second lateral distance is a relative length $\Delta x2$.

In some embodiments, the moving carrier may also average the second lateral distance $\Delta x2$ and the first lateral distance $\Delta x1$ and take the average value as the relative length.

In some embodiments, the moving carrier may also calculate a straight line equation of a straight line determined by SR, and it may then calculate an inversion angle of the slope of the SR straight line equation to obtain an deviation angle. Alternatively, the moving carrier may also calculate a straight line equation of a straight line determined by ST, and it may then calculate an inversion angle of a slope of the ST straight line equation to obtain an deviation angle.

In general, with the above various embodiments, not only the deviation angle and the deviation distance of the moving carrier in the non-traveling direction can be accurately calculated, but also the current position in the traveling direction can be accurately determined. Therefore, it is ensured that the moving carrier does not misalign with and thus collide with the shelving units but approaches to a target position for picking and placing goods or leaves the roadway reliably and safely.

Moreover, in view of the above various embodiments, the following is apparent. Since the traditional technology requires QR codes to be pasted on the ground in the roadway for navigation, such a method has the problems of complicated construction of pasting codes, inconvenient maintenance, high cost, complicated structure, low speed, low efficiency, large error, easy damage, and non-safety. Therefore, the navigation method provided by the present embodiments can realize safe and reliable navigation in the roadway without pasting a code in the roadway, and this method has the advantages of low cost, no need to maintain a code, small error, no damage, safety, and reliability. Moreover, the moving carrier can be navigated according to various feature information of the shelving units at a certain distance. Therefore, the navigation speed is high, and the efficiency is high.

As previously mentioned, the moving carrier enters the roadway from the public area. Generally, the method for determining positions of the moving carrier in the public area is relatively rough, and the error in determining positions is relatively large. When the moving carrier starts to enter the roadway, if the method for determining positions in the public area is used directly for position determination when the moving carrier starts to enter the roadway, there is a risk of hitting the shelving units at the start of entering the roadway.

Figure 6B:
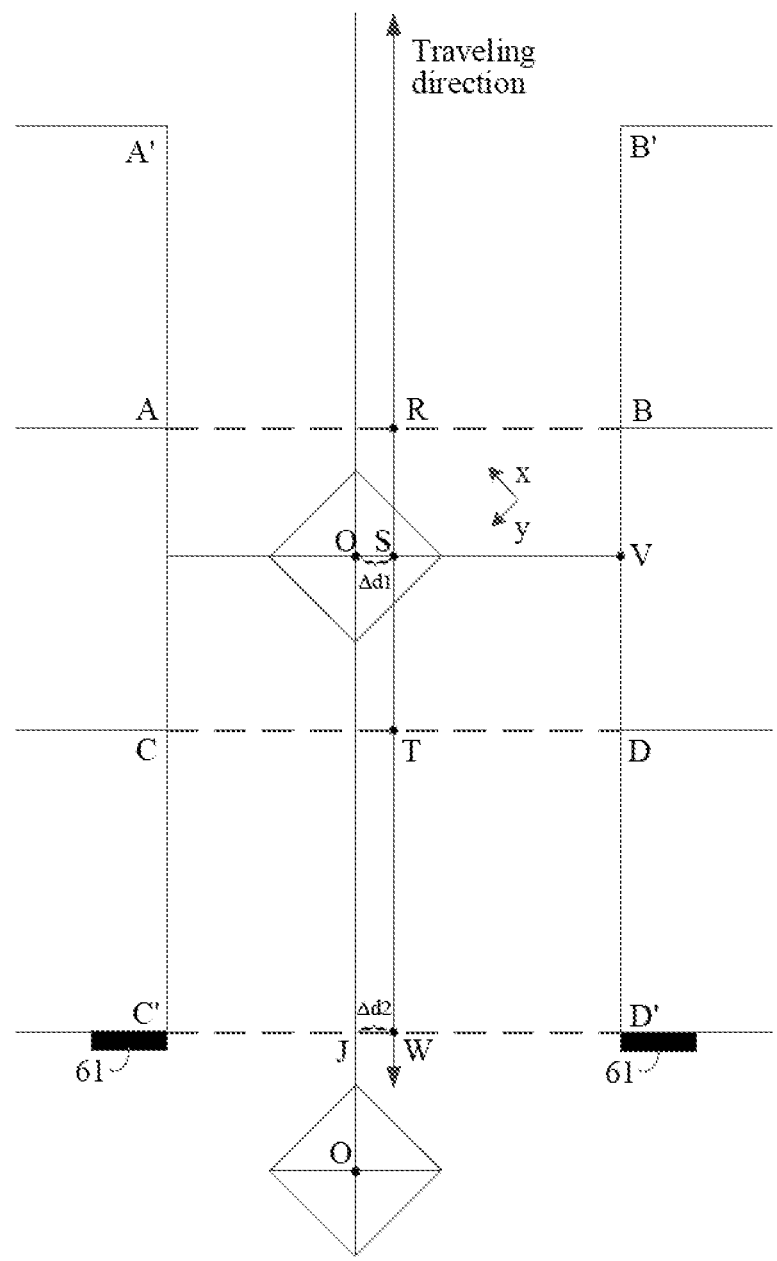
FIG. 6b is a schematic diagram of a moving carrier traveling in a roadway according to an embodiment of the present invention.
Figure 6C:
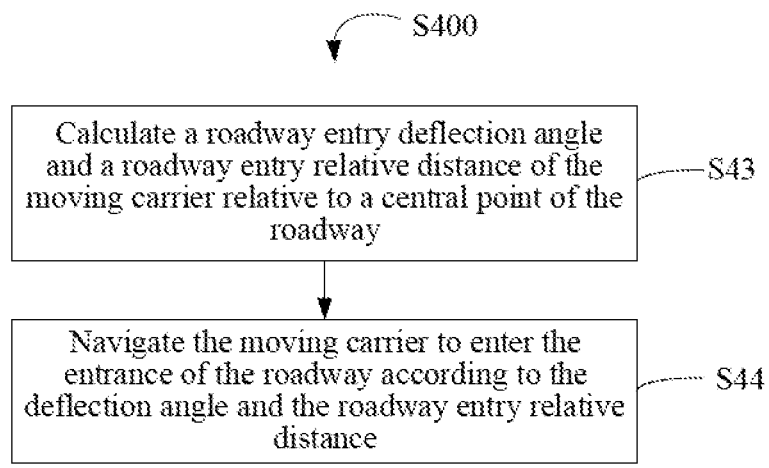
FIG. 6c is a schematic flowchart of a navigation method according to another embodiment of the present invention.

Therefore, in some embodiments, prior to entering the roadway, referring to FIGS. 6b and 6c, FIG. 6c is a schematic flowchart of a navigation method according to another embodiment of the present invention. The navigation method S400 further includes the following steps:

At S43, a roadway entry deflection angle and a roadway entry relative distance of the moving carrier relative to a central point of the roadway are calculated.

At S44, the moving carrier is navigated to enter the entrance of the roadway according to the deflection angle and the roadway entry relative distance.

In the present embodiment, point W is a central point of the roadway. The roadway entry deflection angle is an included angle 2 between straight line C'D' and axis X of the coordinate system of the moving carrier. A perpendicular line perpendicular to straight line C'D' and intersects at point J is drawn through origin O, and a roadway entry relative distance $\Delta d2$ is line segment JW.

In some embodiments, before calculating the roadway entry deflection angle, a user may mount identification objects 61 on the side surfaces of the shelving units on both of two opposite sides at the entrance of the roadway. For example, shelving units CC' and DD' are two shelving units on two opposite sides at the entrance of the roadway. Before the moving carrier enters the roadway, an identification object 61 is set on the side surface of shelving unit CC', the side surface facing the moving carrier. Similarly, an identification object 61 is also set on the side surface of shelving unit DD', the side surface facing the moving carrier. The identification objects 61 are square, arc-shaped, or of other suitable shapes. In some embodiments, the identification object 61 may be an object composed of a plurality of edge line segments. For one line segment among the edge line segments, one end of it is connected to one bracket of the shelving unit leg of the shelving unit and the other end is connected to the other bracket of the same shelving unit leg, the two brackets being opposite to each other. For example, still referring to FIG. 6b, for the identification object 61 set on shelving unit CC', one end of the edge line segment is connected to one side of shelving unit CC' and the other end is connected to the other side of shelving unit CC'. Similarly, for the identification object 61 set on shelving unit DD', one end of the edge line segment thereof is connected to one side of shelving unit DD' and the other end is connected to the other side of shelving unit DD'. It will be appreciated that the identification objects 61 on the shelving units may be set in a way different from the way disclosed in the above embodiment. As long as a mathematical model used for later calculation is suitable, it is possible to calculate the roadway entry deflection angle or the roadway entry relative distance according to the identification objects.

It will be appreciated that the identification object may also be a suitable object such as a baffle. The properties of the baffle include: being hard, being durable, being flat, good light reflectivity, and low cost.

When the roadway entry deflection angle is calculated after the identification object is set, in some embodiments, the moving carrier may calculate an edge straight line equation of an edge line segment of the identification object in the coordinate system, and calculate the roadway entry deflection angle of the moving carrier relative to the central point of the roadway according to the slope of the edge straight line equation. For example, when the moving carrier scans an image of the identification object, a baffle, which is mounted on the shelving unit with a sensor such as a laser radar or a camera, the edge line segment of the identification object is parsed from the baffle image through a straight line segment detection algorithm. Moreover, since the coordinate information of each endpoint may be obtained from the coordinates of two endpoints of the edge line segment when the sensor collects data, a straight line equation y=k*x+b of the edge line segment may be calculated according to the straight line segment detection algorithm in combination with the coordinate information of each endpoint. The slope of the straight line equation of the edge line segment is k, and therefore the roadway entry deflection angle of the moving carrier relative to the entrance of the roadway is $\theta = \tan^{-1}(k)$.

Further, in some embodiments, when the moving carrier calculates the roadway entry relative distance relative to the central point of the roadway, the moving carrier respectively determines the coordinates of the endpoints of the edge line segments in the identification objects on both sides, wherein the endpoints are endpoints closest to the entrance of the roadway. For example, since the two endpoints of the edge line segment of the identification object on each side respectively abuts against the two ends of the side surface of the shelving unit, for shelving unit CC', the endpoint of the edge line segment of the identification object closest to the entrance of the roadway is C', and coordinate values of endpoint C' are $(x_c, y_c)$. For shelving unit DD', the endpoint of the edge line segment of the identification object closest to the entrance of the roadway is D', and coordinate values of endpoint D' are $(x_d, y_d)$.

Secondly, the moving carrier determines center coordinates of the central point of the roadway according to the two endpoint coordinates. A straight line determined by the two endpoints is taken as an identification straight line. A perpendicular line perpendicular to the identification straight line and drawn through the origin of the coordinate system is taken as a roadway entry perpendicular line. For example, a straight line determined by end points C' and D' is an identification straight line C'D', straight line OJ is a roadway entry perpendicular line, and center coordinates of central point W of the roadway are $$\left(\frac{x_c + x_d}{2}, \frac{y_c + y_d}{2}\right).$$

Then, the moving carrier determines coordinates of an intersection point at which the roadway entry perpendicular line and the identification straight line intersects, i.e., calculates coordinate values of point J. For example, a straight line equation of the roadway entry perpendicular line is $$y = -\frac{1}{k} * x,$$

a straight line equation of the identification straight line is y=k*x+b, and the above two straight line equations are combined to obtain coordinate values of point J $(x_j, y_j)$.

Finally, the moving carrier calculates a distance between the coordinates of the intersection point and the center coordinates, and takes the distance as the roadway entry relative distance. For example, the moving carrier calculates, according to the method for calculating the distance between two points, the roadway entry relative distance according to the coordinates of points J $(x_j, y_j)$ and W $$\left(\frac{x_c + x_d}{2}, \frac{y_c + y_d}{2}\right)$$

as follows:

$$\Delta d = \sqrt{\left(x_c - \frac{x_a + x_b}{2}\right)^2 + \left(y_c - \frac{y_a + y_b}{2}\right)^2}$$

Therefore, the moving carrier may be safely and reliably navigated to enter the entrance of the roadway according to the roadway entry deflection angle and the roadway entry relative distance.

In the above embodiments, when calculating the roadway entry deflection angle, a method for detecting a straight line is used instead of a conventional method for detecting an angular point. It would be more robust to calculate the relative entry relative distance of the moving carrier relative to the central point of the roadway by using coordinates of endpoints of a straight line segment, because straight line detection can be calculated by using a large amount of point cloud data, therefore improving the reliability of calculation.

In some embodiments, the preset space further includes a public area. When the moving carrier enters the public area, current position information of the moving carrier is obtained. The moving carrier is navigated according to the current position information and obtained target position information. The current position information may be calculated by the moving carrier using such as an IMU, an odometer, or other inner sensors in combination with a preset motion equation. Alternatively, the current position information may also be calculated with a UWB method. Alternatively, the current position information may also be obtained by performing fusion processing on the current position information calculated by the preset motion equation and the current position information sent by UWB, and the obtained position fusion information is used as final current position information.

In the public area, with global positioning information and the obtained target position information, the moving carrier can be closer to a target roadway or a workstation area. In some embodiments, each moving carrier may also implement emergency obstacle avoidance by using a camera or a laser radar in consideration of a large number of moving carriers in the public area.

In the public area, since the moving carrier generally lacks means for accurate positioning, in some embodiments, it is necessary to increase a reserved safe distance between the respective moving carriers, or to set an identifier such as a QR code at a critical position and a frequently passing position for the camera to perform accurate positioning. The identifier encapsulates positioning information.

In some embodiments, the preset space further includes a workstation area. The workstation area is provided with an identifier. When the moving carrier enters the workstation area, positioning information of the identifier is obtained, and the moving carrier is controlled according to the positioning information. For example, when the moving carrier reaches the workstation area, the camera starts to read a QR code (or other identifier for positioning) of the workstation area, so as to make accurate and corresponding control logic for a target position according to the positioning information encapsulated by the QR code.

It should be noted that in the above various embodiments, there is not necessarily a certain order of precedence between the above various steps, and a person of ordinary skill in the art would have been able to understand, according to the description of the embodiments of the present invention, that in different embodiments, the above respective steps may be performed in a different order. That is, some of the steps may be performed in parallel, and the order of execution of some steps may be exchanged, etc.

Figure 7A:
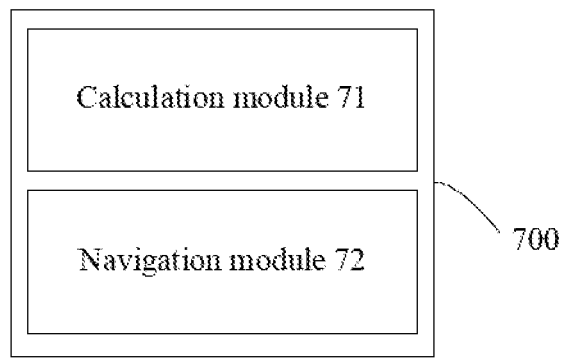
FIG. 7a is a schematic structure diagram of a navigation apparatus according to an embodiment of the present invention.

As another aspect of an embodiment of the present invention, the embodiment of the present invention provides a navigation apparatus which is applied to a moving carrier capable of traveling in a preset space including a roadway formed by at least two rows of shelving units placed opposite to each other. Referring to FIG. 7a, which is a schematic structure diagram of a navigation apparatus according to an embodiment of the present invention, a navigation apparatus 700 includes: a calculation module 71 and a navigation module 72.

The calculation module 71 is used to calculate deviated position information of a moving carrier in a non-traveling direction relative to shelving units in a roadway.

The navigation module 72 is used to navigate the moving carrier according to the deviated position information.

To sum up, since the moving carrier can be navigated based on the deviated position information in the non-traveling direction, the moving carrier is prevented from hitting the shelving units, and, besides, can be reliably navigated in the roadway.

Figure 7B:
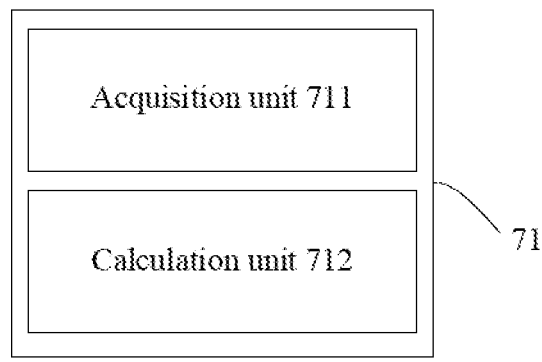

In some embodiments, referring to FIG. 7b, which is a schematic structure diagram of a calculation module in FIG. 7a, the calculation module 71 includes: an acquisition unit 711 and a calculation unit 712.

The acquisition unit 711 is used to acquire feature information of the shelving units.

The calculation unit 712 is used to calculate, according to the feature information, deviated position information of the moving carrier in a non-traveling direction relative to the shelving units in the roadway.

In some embodiments, the shelving units are provided with shelving boards, and the feature information is edge feature information of the shelving boards.

In some embodiments, the moving carrier is provided with a sensor, and the feature information is obtained by the sensor. The calculation unit 712 is used to calculate the deviated position information according to coordinate information of the feature information in a coordinate system of the sensor.

In some embodiments, the calculation unit 712 is used to obtain attitude information of the sensor mounted on the moving carrier, and calculate the deviated position information according to the attitude information and the coordinate information of the feature information in the coordinate system of the sensor.

In some embodiments, the sensor includes a camera, and the attitude information includes a mounting height and a pitch angle at which the camera is mounted on the moving carrier. The calculation unit 712 is used to calculate, according to a camera model of the camera and the coordinate information of the edge feature information in the coordinate system, an edge straight line equation of the edge feature information in the camera model. Further, the calculation unit 712 is used to calculate the deviated position information according to the camera model, the edge straight line equation, the mounting height, and the pitch angle.

In some embodiments, the coordinate system is established in such a way that the camera is taken as origin O. The direction of the optical axis is taken as axis z, the optical axis intersects with the ground at point D. A line perpendicular to the ground is drawn through origin O and intersects with the ground at point Q. A line perpendicular to OD is drawn through origin O and drawn in plane ODQ, and this line intersects with the ground at point E. OE is defined as axis y. A line perpendicular to plane zOy is drawn through origin O, and this line is taken as axis x. As such, the coordinate system is established.

In some embodiments, each shelving unit includes at least two shelving unit legs spaced apart by a preset distance, and the feature information is leg feature information of the shelving unit legs.

In some embodiments, the calculation unit 712 is used to: determine first leg feature information of a first shelving unit leg and second leg feature information of a second shelving unit leg, the first and second shelving unit legs facing the moving carrier in the traveling direction, the first shelving unit leg and the second shelving unit leg being located on different rows of shelving units and being directly opposite to each other; and calculate the deviated position information according to respective coordinate information of the first leg feature information and the second leg feature information in the coordinate system of the sensor.

In some embodiments, a line segment determined by the first shelving unit leg and the second shelving unit leg is a first line segment, and a first straight line perpendicular to the first line segment is drawn through the midpoint of the first line segment. The calculation unit 712 is used to: calculate a first centerline equation of the first straight line in the coordinate system according to the respective coordinate information of the first leg feature information and the second leg feature information in the coordinate system of the sensor; and calculate a first distance from the origin of the coordinate system to the first straight line according to the first centerline equation, and take the first distance as the deviated position information.

In some embodiments, the calculation unit 712 is used to: determine third leg feature information of a third shelving unit leg and fourth leg feature information of a fourth shelving unit leg, the moving carrier in the traveling direction moving away from the third and fourth shelving units, and the third and fourth shelving units being located in different rows of shelving units and directly opposite to each other; and calculate the deviated position information according to respective coordinate information of the third leg feature information and the fourth leg feature information in the coordinate system of the sensor.

A line segment determined by the third shelving unit leg and the fourth shelving unit leg is a second line segment, and a second straight line perpendicular to the second line segment is drawn through the midpoint of the second line segment. In some embodiments, the calculation unit 712 is used to: calculate a second centerline equation of the second straight line in the coordinate system according to the respective coordinate information of the third leg feature information and the fourth leg feature information in the coordinate system of the sensor; and calculate a second distance from the origin of the coordinate system to the second straight line according to the second centerline equation and take the second distance as the deviated position information, or, calculate an average value of the second distance and the first distance and take the average value as the deviated position information.

Figure 7C:
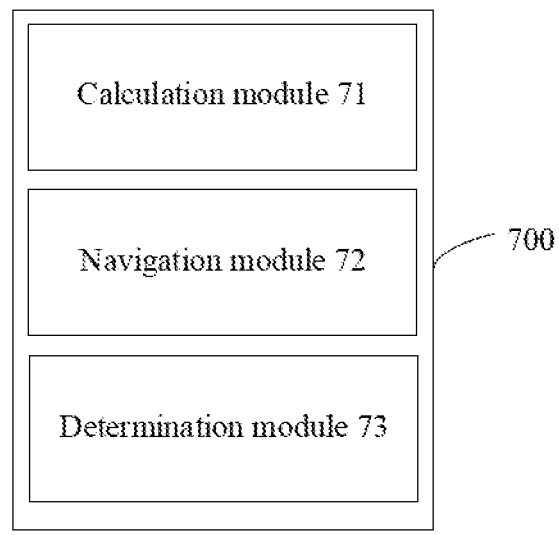
FIG. 7c is a schematic structure diagram of a navigation apparatus according to another embodiment of the present invention.

In some embodiments, referring to FIG. 7c, which is a schematic structure diagram of a navigation apparatus according to another embodiment of the present invention, the navigation apparatus 700 further includes a determination module 73. The determination module 73 is used to determine current coordinates in the traveling direction of the moving carrier.

In some embodiments, the determination module 73 is used to: determine entrance coordinates in the traveling direction of the moving carrier when the moving carrier enters an entrance of the roadway; calculate a movement length that the moving carrier has moved in the traveling direction in the roadway; and calculate current coordinates in the traveling direction of the moving carrier according to the entrance coordinates and the movement length.

There are a plurality of shelving units on the same side, and the plurality of shelving units have the same preset shelving unit length. A position in the traveling direction where the moving carrier starts to enter a current shelving unit is a starting position, and a position in the traveling direction and corresponding to a current position is a final position. In some embodiments, the determination module 73 is used to: acquire the number of shelving units on the same side which the moving carrier passes by in the roadway; determine a relative length that the moving carrier has moved in the traveling direction when it passes by the current shelving unit, the relative length being the absolute value of the difference between the final position and the starting position; multiply the number of shelving units by the shelving unit length to obtain a multiplication result; and add the multiplication result and the relative length to obtain a sum, and take the sum as the movement length.

In some embodiments, the determination module 73 is used to: calculate two first lateral shelving units adjacent to the current shelving unit and located on the same side with the current shelving unit; calculate a first side straight line equation determined by the two first lateral shelving units according to leg feature information of respective shelving unit legs of the two first lateral shelving units; determine coordinate information of a first perpendicular point according to the first side straight line equation and coordinates of the coordinate system's origin, the first perpendicular point being a point at which a line perpendicular to and intersecting with the first side straight line and goes through the origin interests with the first side straight line; and calculate a first lateral distance between coordinate information of the first perpendicular point and leg feature information of the first lateral shelving unit from which the moving carrier is moving away, the first lateral distance being taken as the relative length.

In some embodiments, the determination module 73 is used to: calculate two second lateral shelving units adjacent to the current shelving unit and located on the same side with the second lateral shelving units, the second lateral shelving units and the first lateral shelving units being located on different sides and opposite to each other; calculate a second side straight line equation determined by the two second lateral shelving units according to leg feature information of respective shelving unit legs of the two second lateral shelving units; determine coordinate information of a second perpendicular point according to the second side straight line equation and coordinates of the coordinate system's origin, the second perpendicular point being a point at which a line perpendicular to the second side straight line goes through the origin intersects with the second side straight line; and calculate a second lateral distance between coordinate information of the second perpendicular point and leg feature information of the second lateral shelving unit from which the moving carrier is moving away, the second lateral distance being taken as the relative length, or, calculate an average value of the second lateral distance and the first lateral distance, the average value is taken as the relative length.

Figure 7D:
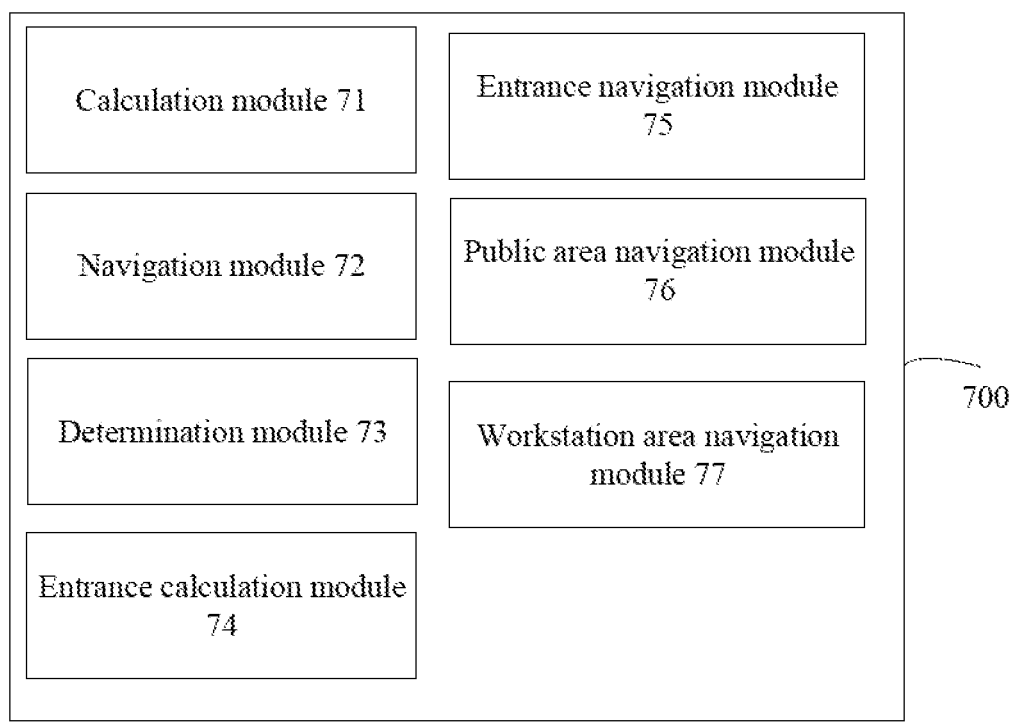
FIG. 7d is a schematic structure diagram of a navigation apparatus according to yet another embodiment of the present invention.

Prior to entering the roadway, in some embodiments, referring to FIG. 7d, which is a schematic structure diagram of a navigation apparatus according to yet another embodiment of the present invention, the navigation apparatus 700 further includes an entrance calculation module 74 and an entrance navigation module 75.

The entrance calculation module 74 is used to calculate a roadway entry deflection angle and a roadway entry relative distance of the moving carrier relative to the central point of the roadway.

The entrance navigation module 75 is used to navigate the moving carrier to enter the entrance of the roadway according to the deflection angle and the roadway entry relative distance.

In some embodiments, identification objects are mounted on the side surfaces of the shelving units on both of two opposite sides at the entrance of the roadway. The entrance calculation module 74 is used to: calculate an edge straight line equation of an edge line segment of the identification object in the coordinate system; and calculate a roadway entry deflection angle of the moving carrier relative to the central point of the roadway according to the slope of the edge straight line equation.

In some embodiments, the entrance navigation module 75 is used to: respectively determine the coordinates of endpoints of the edge line segments in the identification objects on both sides, wherein the endpoints are endpoints closest to the entrance of the roadway; determine center coordinates of the central point of the roadway according to the two endpoint coordinates, wherein the straight line determined by the two endpoints is taken as an identification straight line, and a perpendicular line perpendicular to the identification straight line and drawn through the origin of the coordinate system is taken as a roadway entry perpendicular line; determine coordinates of the intersection point at which the roadway entry perpendicular line and the identification straight line intersects; and calculate the distance between the coordinates of the intersection point and the center coordinates, and take the distance as the roadway entry relative distance.

In some embodiments, the sensor includes a laser radar.

In some embodiments, the navigation module 72 is used to: adjust the moving carrier to travel to a preset traveling direction according to the deviated position information; and navigate the moving carrier.

In some embodiments, the preset space further includes a public area. Referring to FIG. 7d again, the apparatus 700 further includes: a public area navigation module 76 and a workstation area navigation module 77.

The public area navigation module 76 is used to: acquire, when the moving carrier enters the public area, current position information of the moving carrier; and navigate the moving carrier according to the current position information and acquired target position information.

The preset space further includes a workstation area, and the workstation area is provided with an identifier encapsulating positioning information. The workstation area navigation module 77 is used to: acquire, when the moving carrier enters the workstation area, positioning information of the identifier; and control the moving carrier according to the positioning information.

It should be noted that the navigation apparatus may execute the navigation method provided by the embodiment of the present invention, and has functional modules and beneficial effects corresponding to the executed method. Technical details not described in detail in this navigation apparatus embodiment may be found in the navigation method provided in embodiments of the present invention.

Figure 8:
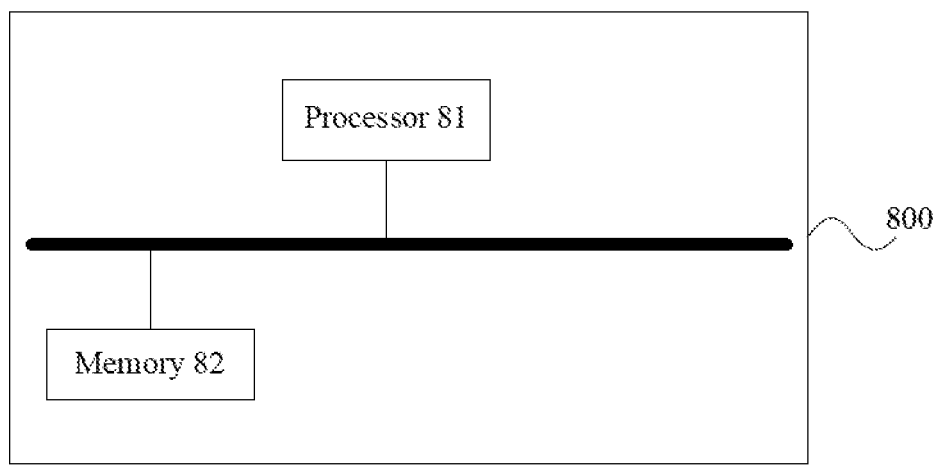
FIG. 8 is schematic circuit block diagram of a moving carrier according to an embodiment of the present invention.

FIG. 8 is schematic circuit block diagram of a moving carrier according to an embodiment of the present invention. As shown in FIG. 8, the moving carrier 800 includes one or more processors 81 and a memory 82. FIG. 8 takes an example of including one processor 81.

The processor 81 and the memory 82 may be connected by using a bus or in another manner. They are connected by using the bus is used as an example in FIG. 8.

The memory 82, as a non-volatile computer-readable storage medium, may be configured to store a non-volatile software program, a non-volatile computer-executable program and modules, such as program instructions/modules corresponding to the navigation method in the embodiments of the present invention. The processor 81 executes various functional applications and data processing of the navigation apparatus by executing non-volatile software programs, instructions, and modules stored in the memory 82, that is, implements the navigation method in the above method embodiments and implements the functions of the modules in the above apparatus embodiments.

The memory 82 may include a high speed random access memory. Furthermore, The memory 82 may include a non-volatile memory, such as at least one magnetic disk storage device, a flash storage device, or other non-volatile solid state storage devices. In some embodiments, the memory 82 optionally includes memories remotely disposed relative to the processor 81, and these remote memories may be connected to the processor 81 via a network. The foregoing examples of the network include, but are not limited to, the Internet, an intranet, a local area network, a mobile communication network, and a combination thereof.

The program instructions/modules are stored in the memory 82, when executed by the one or more processors 81, implement the navigation method in any of the foregoing method embodiments.

The moving carrier 800 in the embodiment of the present invention exists in a variety of forms to perform the various steps described above.

An embodiment of the present invention also provides a non-volatile computer storage medium storing computer-executable instructions that, when executed by one or more processors such as a processor 81 in FIG. 8, may cause the one or more processors to execute the navigation method in any of the above method embodiments.

An embodiment of the present invention also provides a computer program product including a computer program stored on a non-volatile computer-readable storage medium. The computer program includes program instructions that, when executed by a moving carrier, cause the moving carrier to execute the navigation method described in any one of the above.

The moving carrier is prevented from hitting the shelving units, and, besides, can be reliably navigated in the roadway.

The described apparatus or device embodiments are merely examples. The units and modules described as separate parts may or may not be physically separated. Parts displayed as a module or unit may or may not be a physical unit. That is, it may be located in one position, or may be distributed on a plurality of network modules or units. Some or all of the modules may be selected according to actual needs to achieve the objectives of the solutions of the embodiments.

Based on the descriptions of the foregoing implementations, a person skilled in the art may clearly understand that the implementations may be implemented by software in addition to a universal hardware platform, or by hardware. Based on such an understanding, the foregoing technical solutions essentially or the part contributing to the related technology may be implemented in a form of a software product. The computer software product may be stored in a computer-readable storage medium, such as a read-only medium (ROM)/a random access memory (RAM), a magnetic disk, or an optical disc, and includes several instructions for instructing a computer device (which may be a personal computer, a server, a network device, or the like) to perform the methods described in the embodiments or some parts of the embodiments.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A navigation method applied to a moving carrier, the moving carrier being capable of traveling in a preset space comprising a roadway formed by at least two rows of shelving units placed opposite to each other, the method comprising:
   acquiring deviated position information of the moving carrier in a non-traveling direction in the roadway relative to the shelving units; and
   navigating the moving carrier according to the deviated position information;
   wherein the acquiring the deviated position information of the moving carrier in the non-traveling direction in the roadway relative to the shelving units comprises: acquiring feature information of the shelving units from a sensor mounted on the moving carrier; and calculating the deviated position information according to coordinate information of the feature information in a coordinate system of the sensor;
   wherein each shelving unit comprises at least two shelving units legs spaced apart by a preset distance, and the feature information is leg feature information of the shelving unit legs;
   wherein the calculating the deviated position information according to the coordinate information of the feature information in the coordinate system of the sensor comprises:
   determining first leg feature information of a first shelving unit leg and second leg feature information of a second shelving unit leg, the first shelving unit leg and the second shelving unit leg being faced by the moving carrier in the traveling direction, and the first shelving unit leg and the second shelving unit leg being located on different rows of shelving units and directly opposite to each other; and calculating the deviated position information according to coordinate information of the first leg feature information in the coordinate system of the sensor and coordinate information of the second leg feature information in the coordinate system of the sensor.

2. The method according to claim 1, further comprising: determining a current coordinate in the traveling direction of the moving carrier.

3. The method according to claim 2, wherein the determining the current coordinate in the traveling direction of the moving carrier comprises:

determining an entrance coordinate in the traveling direction when the moving carrier enters an entrance of the roadway;

calculating a movement length that the moving carrier moves in the traveling direction in the roadway; and calculating the current coordinate of the moving carrier in the traveling direction according to the entrance coordinate and the movement length.

4. The method according to claim 3, wherein there are a plurality of shelving units on the same side, the plurality of shelving units having a same preset shelving unit length, a position in the traveling direction where the moving carrier starts to enter a current shelving unit is taken as a starting position, and a position corresponding to a current position in the traveling direction is taken as a final position;

the calculating the movement length that the moving carrier moves in the traveling direction in the roadway comprises:

acquiring the number of shelving units on the same side which the moving carrier passes by in the roadway;

determining a relative length that the moving carrier moves in the traveling direction when it passes by the current shelving unit, the relative length being an absolute value of a difference between the final position and the starting position;

multiplying the number of shelving units by the shelving unit length to obtain a multiplication result; and adding the multiplication result and the relative length to obtain a sum, the sum being taken as the movement length.

5. The method according to claim 1, wherein, prior to entering the roadway, the method further comprises:

calculating a roadway entry deflection angle and a roadway entry relative distance of the moving carrier relative to a central point of the roadway; and navigating the moving carrier to enter an entrance of the roadway according to the deflection angle and the roadway entry relative distance.

6. The method according to claim 5, wherein identification objects are mounted on side surfaces of shelving units on two opposite sides at the entrance of the roadway, wherein each identification object comprises a plurality of edge line segments; and the calculating the roadway entry deflection angle of the moving carrier relative to the central point of the roadway comprises:

calculating an edge straight line equation of one of the plurality of edge line segments in the coordinate system; and calculating a roadway entry deflection angle of the moving carrier relative to a central point of the roadway according to a slope of the edge straight line equation;

wherein the edge straight line is a straight line where the one of the plurality of edge line segments is located, the edge straight line equation is $y=k*x+h$, wherein the edge straight line equation is calculated according to straight line segment detection algorithm in combination with the coordinate information of each endpoint of the straight line segment, wherein the coordinate information of each endpoint is obtained by the sensor.

7. The method according to claim 6, wherein the calculating the roadway entry relative distance of the moving carrier relative to a central point of the roadway comprises:

respectively determining coordinates of endpoints of the edge line segments of the identification objects on both sides, the endpoints being closest to the entrance of the roadway;

determining center coordinate of the central point of the roadway according to the coordinates of the two endpoints, a straight line determined by the two endpoints being taken as an identification straight line, and a perpendicular line perpendicular to the identification straight line and drawn through the origin of the coordinate system being taken as a roadway entry perpendicular line, wherein in the origin of the coordinate system is a center of the sensor;

determining coordinates of an intersection point at which the roadway entry perpendicular line and the identification straight line intersects; and calculating a distance between the intersection point's coordinates and the center coordinates, the distance being taken as the roadway entry relative distance.

8. The method according to claim 1, wherein the sensor comprises a laser radar.

9. The method according to claim 1, wherein the navigating the moving carrier according to the deviated position information comprises:

adjusting the moving carrier to travel to a preset traveling direction according to the deviated position information; and navigating the moving carrier.

10. The method according to claim 1, wherein the preset space further comprises a public area, and the method further comprises:

when the moving carrier enters the public area, acquiring current position information of the moving carrier; and navigating the moving carrier according to the current position information and acquired target position information.

11. The method according to claim 1, wherein the preset space further comprises a workstation area, the workstation area being provided with an identifier encapsulating positioning information, identifier comprises at least one of a OR code, an electronic tag, a bar code and a graphical object; and the method further comprises:

when the moving carrier enters the workstation area, acquiring positioning information of the identifier; and controlling the moving carrier according to the positioning information.

12. A moving carrier being capable of traveling in a preset space comprising a roadway formed by at least two rows of shelving units placed opposite to each carrier comprising:

at least one processor; and a memory communicatively connected to the at least one processor, wherein the memory stores instructions executable by the at least one processor, the instructions being executed by the at least one processor to enable the at least one processor to:

acquire deviated position information of the moving carrier in a non-traveling direction in the roadway relative to the shelving units; and navigate the moving carrier according to the deviated position information;

wherein the at least one processor is further enabled to: acquire feature information of the shelving units from a sensor mounted on the moving carrier; and calculate the deviated position information according to coordinate information of the feature information in a coordinate system of the sensor;

wherein each shelving unit comprises at least two shelving unit legs spaced apart by a preset distance, and the feature information is leg feature information of the shelving unit legs;

wherein the at least one processor is further enabled to:

determine first leg feature information of a first shelving unit leg and second leg feature information of a second shelving unit leg, the first shelving unit leg and the second shelving unit leg being faced by the moving carrier in the traveling direction, and the first shelving unit leg and the second shelving unit leg being located on different rows of shelving units and directly opposite to each other; and calculate the deviated position information according to coordinate information of the first leg feature information in the coordinate system of the sensor and coordinate information of the second leg feature information in the coordinate system of the sensor.

13. A navigation system comprising:

a server; and a moving carrier communicating with the server; wherein the moving carrier comprises at least one processor; and a memory communicatively connected to the at least one processor;

wherein the moving carrier is capable of traveling in a preset space comprising a roadway formed by at least two rows of shelving units placed opposite to each other;

wherein the memory stores instructions executable by the at least one processor, the at least one processor is configured to execute the instructions to:

acquire deviated position information of the moving carrier in a non-traveling direction in the roadway relative to the shelving units; and navigate the moving carrier according to the deviated position information;

wherein the at least one processor is further configured to:

acquire feature information of the shelving units from a sensor mounted on the moving carrier; and calculate the deviated position information according to coordinate information of the feature information in a coordinate system of the sensor;

wherein a shelving board is mounted on the shelving units, and the feature formation is edge feature information of the shelving board, the at least one processor is further configured to:

acquire attitude information of the sensor wherein the sensor comprises a photographing device, and the attitude information comprises a mounting height at which the photographing device is mounted on the moving carrier and a pitch angle at which the photographing device is mounted on the moving carrier;

calculate, according to a camera model of the photographing device and the coordinate information of the edge feature information in the coordinate system, an edge straight line equation of the edge feature information, wherein the camera model comprises in-camera parameters; and calculate the deviated position information according to the camera model, the edge straight line equation, the mounting height, and the pitch angle;

wherein an edge straight line is a straight line where the shelving board edge is located, the edge straight line equation is $v=m*u+n$, wherein the edge straight line equation is calculated according to coordinates of two points on the straight line of the shelving board edge, wherein the coordinates of two points on the straight line of the shelving board edge are obtained according to data collected by the sensor and the camera model.

* * * * *